(12) United States Patent
Shinzato

(10) Patent No.: US 9,740,770 B2
(45) Date of Patent: Aug. 22, 2017

(54) COUNTING DEVICE, COUNTING PROGRAM, MEMORY MEDIUM, AND COUNTING METHOD

(71) Applicant: Rakuten, Inc., Shinagawa-ku, Tokyo (JP)

(72) Inventor: Keiji Shinzato, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 427 days.

(21) Appl. No.: 14/374,692

(22) PCT Filed: Mar. 6, 2013

(86) PCT No.: PCT/JP2013/056196
§ 371 (c)(1),
(2) Date: Jul. 25, 2014

(87) PCT Pub. No.: WO2013/161397
PCT Pub. Date: Oct. 31, 2013

(65) Prior Publication Data
US 2015/0006533 A1    Jan. 1, 2015

(30) Foreign Application Priority Data
Apr. 27, 2012 (JP) ................................. 2012-103996

(51) Int. Cl.
G06F 17/30 (2006.01)
G06F 17/24 (2006.01)
G06F 17/27 (2006.01)

(52) U.S. Cl.
CPC ...... *G06F 17/30684* (2013.01); *G06F 17/247* (2013.01); *G06F 17/271* (2013.01); *G06F 17/2795* (2013.01); *G06F 17/30705* (2013.01)

(58) Field of Classification Search
CPC combination set(s) only.
See application file for complete search history.

(56) References Cited

U.S. PATENT DOCUMENTS 6,493,663 B1 *  12/2002  Ueda ................. G06F 17/271
                                                  704/9
2007/0038643 A1 *  2/2007  Epstein ............ G06F 17/30876

FOREIGN PATENT DOCUMENTS

JP           4815934 B2        11/2011

OTHER PUBLICATIONS

International Search Report for PCT/JP2013/056196 dated May 7, 2013.
Written Opinion for PCT/JP2013/056196 dated May 7, 2013.

* cited by examiner

*Primary Examiner* — Shyue Jiunn Hwa
(74) *Attorney, Agent, or Firm* — Sughrue Mion, PLLC

(57) ABSTRACT

A counting device (100) provided with a subtree generating part (123) for generating first subtree comprising a first sentence and a second subtree comprising a second sentence. The counting device (100) is provided with: a categorizing part (125) for categorizing the first subtree in the same group as the second subtree when it is determined that a first expression represented by the first subtree and a second expression represented by a second subtree represent a matching content; and an output part (127) for outputting the number of subtrees categorized in the group, or an expression represented by a plurality of syntax trees or one of the subtrees categorized in the aforementioned group.

10 Claims, 40 Drawing Sheets

FIG.2

QUESTION SCREEN

| QUESTION 1: WHAT WAS GOOD WHEN YOU USED THE DETERGENT? |
|---|
| RESPONSE |
| 靴下の汚れが綺麗に落ちる。<br>The dirt of socks comes off finely. |

FIG.7A FULL TREE
靴下の汚れが綺麗に落ちる。
The dirt of socks comes off finely.
FIG.7B SUBTREE
靴下の汚れが綺麗に落ちる。
The dirt of socks comes off finely.
FIG.7C SUBTREE
靴下の汚れが落ちる。
The dirt of socks comes off.
FIG.7D SUBTREE
汚れが綺麗に落ちる。
The dirt comes off finely.
FIG.7E SUBTREE
汚れが落ちる。
The dirt comes off.
FIG.7F SUBTREE
綺麗に落ちる。
Comes off finely.
FIG.7G SUBTREE
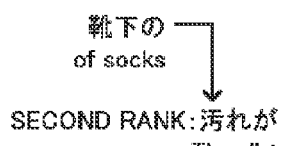
靴下の汚れが。
The dirt of socks.

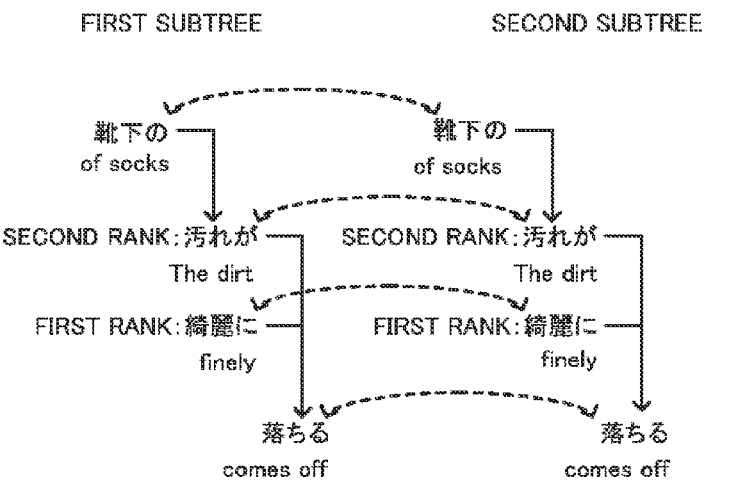
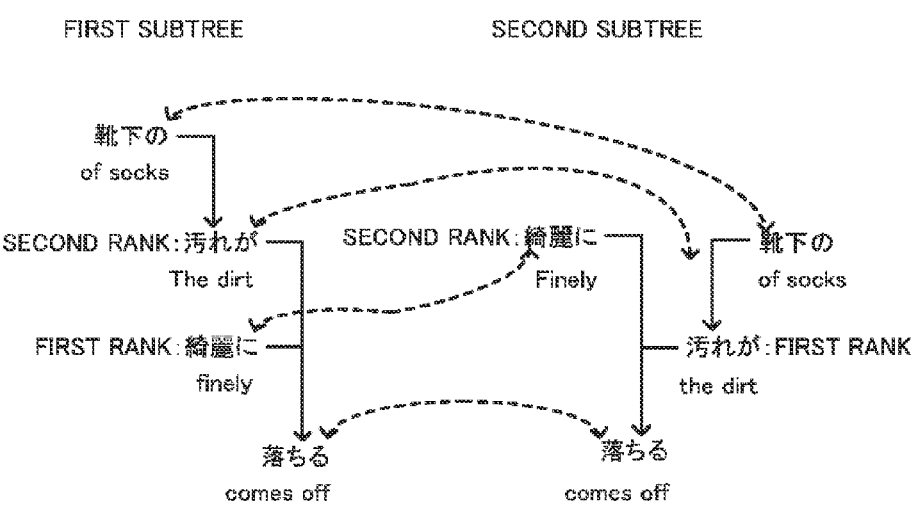

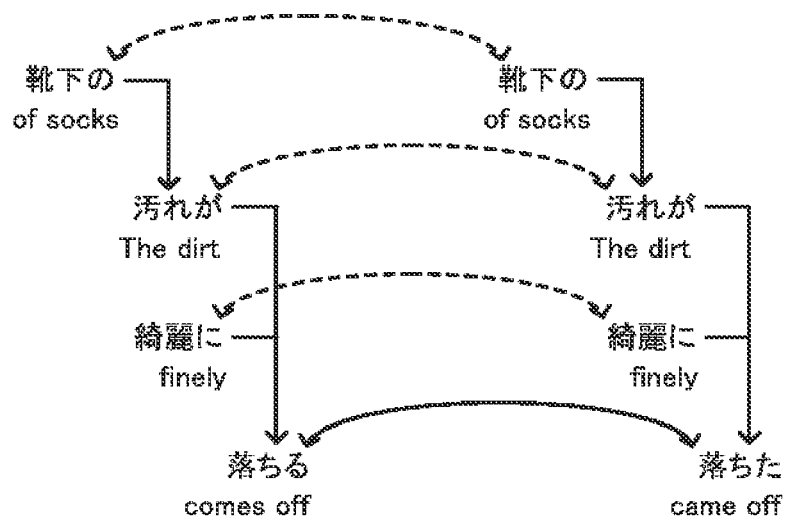

FIG.11

INPUT SENTENCE TABLE

| SENTENCE ID | SENTENCE |
|---|---|
| ST1 | 靴下の汚れが綺麗に落ちる。<br>The dirt of socks comes off finely. |
| ST2 | 靴下の汚れが綺麗に取れる。<br>The dirt of socks is removed finely. |
| ST3 | ヨゴレが綺麗に落ちる。<br>The DIRT comes off finely. |
| ST4 | 汚れが落ちた。<br>The dirt came off. |
| ST5 | 汚れが落ちる。<br>The dirt comes off. |
| ST6 | パッケージが格好いい。<br>The package is nice. |

FIG.12

PHRASE TABLE

| SENTENCE ID | PHRASE ID | PHRASE |
|---|---|---|
| ST1 | SG11 | 靴下の<br>of socks |
| ST1 | SG12 | 汚れが<br>The dirt |
| ST1 | SG13 | 綺麗に<br>finely |
| ST1 | SG14 | 落ちる<br>comes off |
| ST2 | SG21 | 靴下の<br>of socks |
| ST2 | SG22 | 汚れが<br>The dirt |
| ST2 | SG23 | 綺麗に<br>finely |
| ST2 | SG24 | 取れる<br>is removed |
| ST3 | SG31 | ヨゴレが<br>The DIRT |
| ST3 | SG32 | 綺麗に<br>finely |
| ST3 | SG33 | 落ちる<br>comes off |
| ST4 | SG41 | 汚れが<br>The dirt |
| ST4 | SG42 | 落ちた<br>came off |
| ST5 | SG51 | 汚れが<br>The dirt |
| ST5 | SG52 | 落ちる<br>comes off |
| ST6 | SG61 | パッケージが<br>The package |
| ST6 | SG62 | 格好いい<br>is nice |

FIG.13

SUBTREE TABLE

| SENTENCE ID | SUBTREE ID | PHRASE ID | PHRASE | HEAD PHRASE ID |
|---|---|---|---|---|
| ST1 | PT10 | SG11 | 靴下の<br>of socks | SG12 |
| ST1 | PT10 | SG12 | 汚れが<br>The dirt | SG14 |
| ST1 | PT10 | SG13 | 綺麗に<br>finely | SG14 |
| ST1 | PT10 | SG14 | 落ちる<br>comes off | – |
| ST1 | PT11 | SG11 | 靴下の<br>of socks | SG12 |
| ST1 | PT11 | SG12 | 汚れが<br>The dirt | SG14 |
| ST1 | PT11 | SG14 | 落ちる<br>comes off | – |
| ... | ... | ... | ... | ... |
| ST2 | PT20 | SG21 | 靴下の<br>of socks | SG22 |
| ST2 | PT20 | SG22 | 汚れが<br>The dirt | SG24 |
| ST2 | PT20 | SG23 | 綺麗に<br>finely | SG24 |
| ST2 | PT20 | SG24 | 取れる<br>is removed | – |
| ... | ... | ... | ... | ... |
| ST6 | PT60 | SG61 | パッケージが<br>The package | SG62 |
| ST6 | PT60 | SG62 | 格好いい<br>is nice | – |

FIG.14A

NOTATION TABLE

| WORD | WORD |
|---|---|
| 汚れ<br>dirt | ヨゴレ<br>DIRT |
| 落ちる<br>come off | 落る<br>COME OFF |
| 取れる<br>removed | トレル<br>REMOVED |
| ... | ... |

FIG.14B

SYNONYM TABLE

| WORD | WORD |
|---|---|
| 落ちる<br>come off | 取れる<br>is removed |
| におい<br>smell | 香り<br>fragrance |
| 価格<br>cost | 値段<br>price |
| ... | ... |

FIG.14C

CONJUGATION TABLE

| WORD | WORD |
|---|---|
| 落ちる<br>comes off | 落ちた<br>came off |
| ... | ... |

FIG.15

GROUP TABLE

| GROUP ID | SUBTREE ID | HEIGHT | TOTAL BRANCH NUMBER | REPRESENT- ATIVE TREE | GROUP NAME | GROUP NAME MATCHING TREE COUNT | TOTAL TREE NUMBER |
|---|---|---|---|---|---|---|---|
| G10 | PT10,PT20 | 2 | 3 | PT10 | 靴下の汚れが綺麗に落ちる。<br>The dirt of socks comes off finely. | 1 | 2 |
| G11 | PT11,PT21 | 2 | 2 | PT11 | 靴下の汚れが落ちる。<br>The dirt of socks comes off. | 1 | 2 |
| G12 | PT12,PT22,PT30 | 1 | 2 | PT12 | 汚れが綺麗に落ちる。<br>The dirt comes off finely. | 1 | 3 |
| G13 | PT13=PT50, PT23,PT31,PT40 | 1 | 1 | PT13 | 汚れが落ちる。<br>The dirt comes off. | 2 | 5 |
| G14 | PT14=PT32, PT24 | 1 | 1 | PT14 | 綺麗に落ちる。<br>come off finely. | 2 | 3 |
| G15 | PT15=PT25 | 1 | 1 | PT15 | 靴下の汚れが。<br>The dirt of socks. | 1 | 2 |
| G16 | PT60 | 1 | 1 | PT60 | パッケージが格好いい。<br>The package is nice | 1 | 1 |

FIG.16

INCLUSION RELATIONSHIP TABLE

| GROUP ID | CLOSEST SUPERIOR GROUP ID |
|---|---|
| G10 | G11, G12 |
| G11 | G13, G15 |
| G12 | G13, G14 |
| G13 | – |
| G14 | – |
| G15 | – |
| G16 | – |

FIG.17

TIER STRUCTURE TABLE

| SET ID | GROUP ID | CLOSEST SUPERIOR GROUP ID |
|---|---|---|
| SG1 | G13 | – |
| SG1 | G11 | G13 |
| SG1 | G12 | G13 |
| SG1 | G10 | G11 |
| SG1 | G10 | G12 |
| SG2 | G14 | – |
| SG2 | G12 | G14 |
| SG2 | G10 | G12 |
| SG3 | G15 | – |
| SG3 | G11 | G15 |
| SG3 | G10 | G11 |
| SG4 | G16 | – |

FIG.18A
FULL TREE FT1

SG11:靴下の
of socks

SG12:汚れが
The dirt

SG13:綺麗に
finely

SG14:落ちる
comes off

靴下の汚れが綺麗に落ちる。
The dirt of socks comes off finely.

FIG.18B
SUBTREE PT10

SG11:靴下の
of socks

SG12:汚れが
The dirt

SG13:綺麗に
finely

SG14:落ちる
comes off

靴下の汚れが綺麗に落ちる。
The dirt of socks comes off finely.

FIG.18C
SUBTREE PT11

SG11:靴下の
of socks

SG12:汚れが
The dirt

SG14:落ちる
comes off

靴下の汚れが落ちる。
The dirt of socks comes off.

FIG.18D
SUBTREE PT12

SG12:汚れが
The dirt

SG13:綺麗に
finely

SG14:落ちる
comes off

汚れが綺麗に落ちる。
The dirt comes off finely.

FIG.18E
SUBTREE PT13

SG12:汚れが
The dirt

SG14:落ちる
comes off

汚れが落ちる。
The dirt comes off.

FIG.18F
SUBTREE PT14

SG13:綺麗に
finely

SG14:落ちる
comes off

綺麗に落ちる。
Comes off finely.

FIG.18G
SUBTREE PT15

SG11:靴下の
of socks

SG12:汚れが
The dirt

靴下の汚れが。
The dirt of socks.

FULL TREE FT2

靴下の汚れが綺麗に取れる。
The dirt of socks is removed finely.

SUBTREE PT20

靴下の汚れが綺麗に取れる。
The dirt of socks is removed finely.

SUBTREE PT21

靴下の汚れが取れる。
The dirt of socks is removed.

SUBTREE PT22

汚れが綺麗に取れる。
The dirt is removed finely.

SUBTREE PT23

汚れが取れる。
The dirt is removed.

SUBTREE PT24

綺麗に取れる。
is removed finely.

SUBTREE PT25

靴下の汚れが。
The dirt of socks.

FULL TREE FT3

SG31:ヨゴレが ─
The DIRT

SG32:綺麗に ─
finely

SG33:落ちる
comes off

ヨゴレが綺麗に落ちる。
The DIRT comes off finely.

SUBTREE PT30

SG31:ヨゴレが ─
The DIRT

SG32:綺麗に ─
finely

SG33:落ちる
comes off

ヨゴレが綺麗に落ちる。
The DIRT comes off finely.

SUBTREE PT31

SG31:ヨゴレが ─
The DIRT

SG33:落ちる
comes off

ヨゴレが落ちる。
The DIRT comes off.

SUBTREE PT32

SG32:綺麗に ─
finely

SG33:落ちる
comes off

綺麗に落ちる。
comes off finely.

FIG.21A
FULL TREE FT4

SG41: 汚れが — The dirt ↓
SG42: 落ちた came off

汚れが落ちた。
The dirt came off.

FIG.21B
FULL TREE FT5

SG51: 汚れが — The dirt ↓
SG52: 落ちる comes off

汚れが落ちる。
The dirt comes off.

FIG.21C
FULL TREE FT6

SG61: パッケージが — The package ↓
SG62: 格好いい is nice

パッケージが格好いい。
The package is nice.

FIG.21D
SUBTREE PT40

SG41: 汚れが — The dirt ↓
SG42: 落ちた came off

汚れが落ちた。
The dirt came off.

FIG.21E
SUBTREE PT50

SG51: 汚れが — The dirt ↓
SG52: 落ちる comes off

汚れが落ちる。
The dirt comes off.

FIG.21F
SUBTREE PT60

SG61: パッケージが — The package ↓
SG62: 格好いい is nice

パッケージが格好いい。
The package is nice.

SUBTREE

私は汚れが落ちると、聞かない。
I do not hear the dirt comes off.

SUBTREE

私は汚れが落ちないと、聞く。
I hear the dirt does not come off.

FIG.33

INPUT SENTENCE TABLE

| SENTENCE ID | SENTENCE |
|---|---|
| ST11 | とても値段が安い。<br>The price is very low. |
| ST12 | 価格が安い。<br>The cost is low. |
| ST13 | 値段が魅力。<br>The price is attractive. |
| ST14 | 値段。<br>The price. |
| ST15 | 価格。<br>The cost. |
| ST16 | 安い。<br>Low. |
| ST17 | 汚れ落ち。<br>Detergency. |
| ST18 | 汚れ落ち。<br>Detergency. |

FIG.34A FULL TREE FT11
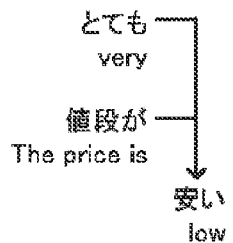
とても値段が安い。
The price is very low.
FIG.34B SUBTREE PT110
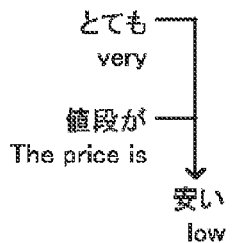
とても値段が安い。
The price is very low.
FIG.34C SUBTREE PT111
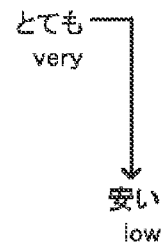
とても安い。
Very low.
FIG.34D SUBTREE PT112
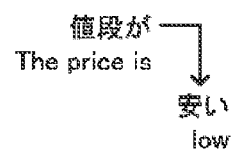
値段が安い。
The price is low.
FIG.34E FULL TREE FT12
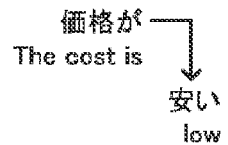
価格が安い。
The cost is low.
FIG.34F SUBTREE PT120
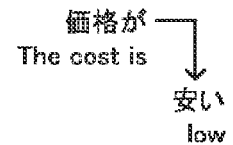
価格が安い。
The cost is low.
FIG.34G FULL TREE FT13
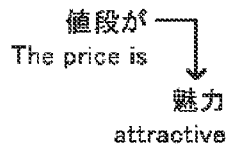
値段が魅力。
The price is attractive.
FIG.34H SUBTREE PT130
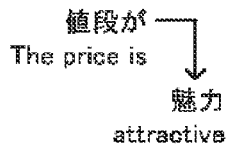
値段が魅力。
The price is attractive.

FIG.35A
FULL TREE FT14

価格
The cost

価格。
The cost.

FIG.35B
SUBTREE PT140

価格 ┐
The cost ↓
   *
   *

価格*。
The cost *.

FIG.35C
SUBTREE PT141

* ┐
* ↓
価格
the cost

*価格。
* the cost.

FIG.35D
FULL TREE FT15

値段
The price

値段。
The price.

FIG.35E
SUBTREE PT150

値段 ┐
The price ↓
   *
   *

値段*。
The price *.

FIG.35F
SUBTREE PT151

* ┐
* ↓
値段
the price

*値段。
* the price.

FIG.35G
FULL TREE FT16

安い
low

安い。
Low.

FIG.35H
SUBTREE PT160

安い ┐
Low ↓
  *
  *

安い*。
Low *.

FIG.35I
SUBTREE PT161

* ┐
* ↓
安い
low

*安い。
* low.

FIG.36A
FULL TREE FT17

汚れ落ち
Detergency

汚れ落ち。
Detergency.

FIG.36B
SUBTREE PT170

汚れ落ち ┐
Detergency ↓
　　　*
　　　*

汚れ落ち＊。
Detergency *.

FIG.36C
SUBTREE PT171

* ┐
* ↓
汚れ落ち
Detergency

＊汚れ落ち。
* Detergency.

FIG.36D
FULL TREE FT18

汚れ落ち
Detergency

汚れ落ち。
Detergency.

FIG.36E
SUBTREE PT180

汚れ落ち ┐
Detergency ↓
　　　*
　　　*

汚れ落ち＊。
Detergency *.

FIG.36F
SUBTREE PT181

* ┐
* ↓
汚れ落ち
Detergency

＊汚れ落ち。
* Detergency.

COUNTING DEVICE, COUNTING PROGRAM, MEMORY MEDIUM, AND COUNTING METHOD

CROSS REFERENCE TO RELATED APPLICATIONS

This application is a National Stage of International Application No. PCT/JP2013/056196 filed Mar. 6, 2013, claiming priority based on Japanese Patent Application No. 2012-103996 filed Apr. 27, 2012, the contents of all of which are incorporated herein by reference in their entirety.

TECHNICAL FIELD

The present invention relates to a counting device, a counting program, a memory medium and a counting method.

BACKGROUND ART

A text mining device has been known from before that can find multiple texts representing the same characteristic content despite having mutually different expressions, from among multiple input texts (for example, see Patent Literature 1). This text mining device mutually associates and stores multiple differing expressions having the same characteristic content. This text mining device is such that when an expression associated with a prescribed expression is included in input text, the expression is converted to the prescribed expression and text containing the prescribed expression is found.

CITATION LIST

Patent Literature

Patent Literature 1: Japanese Patent No. 4815934.

SUMMARY OF INVENTION

Technical Problem

In the art of Patent Literature 1, the problem existed that which expressions were used how much cannot be counted in text consisting of multiple input texts.

In consideration of the foregoing, it is an objective of the present invention to provide a counting device, counting program computer-readable recording medium on which a counting program is recorded, and counting method, with which it is possible to count what expressions are used how much in multiple input texts.

Solution to Problem

In order to achieve the above objective, the counting device according to a first aspect of the present invention comprises:

an input part for inputting a first sentence and a second sentence;

a syntax analyzing part for generating a syntax tree of the first sentence and a syntax tree of the second sentence by accomplishing syntax analysis on the first sentence and the second sentence;

a subtree generating part for generating one or multiple first subtrees that are subtrees comprising the first sentence, from the generated syntax tree of the first sentence, and generating one or multiple second subtrees that are subtrees comprising the second sentence, from the generated syntax tree of the second sentence;

a match determination part for determining whether or not a first expression represented by a first subtree comprising a subtree combination and a second expression represented by a second subtree comprising the subtree combination represent matching content, for one or multiple subtree combinations that are combinations or any one of the one or multiple first subtrees generated and one or multiple of the second subtrees generated;

a categorizing part for categorizing a first subtree representing a first expression and a second subtree representing a second expression into the same group for one combination of the first expression and the second expression determined to be representing matching content, or respective multiple combinations of the first expression and the second expression determined to be representing matching content; and, an output part for outputting the number of subtrees categorized into the group, or an expression respectively represented by one subtree or multiple subtrees categorized into the group.

In addition, in the counting device according to the first aspect, the match determination part may determine that a first expression represented by the first subtree and a second expression represented by the second subtree match when, for the one subtree combination or the multiple subtree combinations, the first subtree comprising the subtree combination and the second subtree comprising the subtree combination match in all of the following: height, branch number, and phrases respectively divided into a root and one or multiple leaves.

In addition, in the counting device according to the first aspect, the subtree generating part may generate one or multiple first subtrees possessing at least a modifier phrase modifying another phrase and a head phrase that is the other phrase, from among multiple phrases comprising the first sentence, from the generated syntax tree of the first sentence, and one or multiple second subtrees possessing at least a modifier phrase modifying another phrase and a head phrase that is the other phrase, from among the multiple phrases comprising the second sentence, from the generated syntax tree of the second sentence; and the match determination part may determine whether or not a first expression represented by the first subtree and a second expression represented by the second subtree match based on whether or not the modifier phrase of the first subtree comprising the subtree combination and the modifier phrase of the second subtree comprising the subtree combination match, and whether or not the head phrase of the first subtree and the head phrase of the second subtree match, for the one subtree combination or each of the multiple subtree combinations.

In addition, in the counting device according to the first aspect, the match determination part, for one group combination or each of multiple group combinations that are combinations of a first group and a second group into which one or multiple subtrees are respectively categorized, may determine an inclusion relationship between the first group and the second group, based on the height, branch number and number of phrases of subtrees belonging to the first group and the height, branch number and number of phrases of subtrees belonging to the second group; and the output part, based on the determined inclusion relationship, may arrange and output an expression represented by one subtree or multiple expressions respectively represented by multiple subtrees categorized in the first group, and an expression represented by one subtree or multiple expressions respectively represented by multiple subtrees categorized in the second group.

In addition, in the counting device according to the first aspect, the match determination part, for group combinations in which the number of modifier phrases possessed by subtrees categorized in the first group is smaller than the number of modifier phrases possessed by subtrees categorized in the second group from the one group combination or the multiple group combinations, may determine that the expression represented by subtrees categorized to the first group is a superior expression to the expression represented by subtrees categorized to the second group when all of the modifier phrases possessed by subtrees categorized to the first group match any of the modifier phrases possessed by subtrees categorized to the second group; and the categorizing part, for the one group combination or the respective multiple group combinations, may make the first group a superior group to the second group when it is determined that the expression represented by subtrees categorized to the first group comprising the group combination is a superior expression to the expression represented by subtrees categorized to the second group comprising the group combination.

In addition, in the counting device according to the first aspect, the match determination part, for group combinations comprising a first group into which subtrees possessing a head phrase and a modifier phrase are categorized and a second group into which subtrees possessing a head phrase and a modifier phrase and a phrase modifying the modifier phrase are categorized from the one group combination or from among the multiple group combinations, may determine that the expression represented by subtrees categorized to the first group is a superior expression to the expression represented by subtrees categorized to the second group upon determining that the head phrase of a subtree categorized to the first group and the head phrase of a subtree categorized to the second group match, and that the modifier phrase of a subtree categorized to the first group and the modifier phase of a subtree categorized to the second group match.

Furthermore, in the counting device according to the first aspect, the match determination part, for the one subtree combination or each of the multiple subtree combinations:

may determine that a modifier phrase of the first subtree comprising the subtree combination and a modifier phrase of a second subtree comprising the subtree combination match when the modifier phrase of the first subtree is a synonym of a modifier phrase of the second subtree, or when the difference between a modifier phrase of the first subtree and a modifier phrase of the second subtree is a difference in conjugation, or when the difference between a modifier phrase of the first subtree and a modifier phrase of the second subtree is a difference in notation; and may determine that a head phrase of the first subtree and a head phrase of the second subtree match when a head phrase of the first subtree is a synonym for a head phrase of the second subtree, or when the difference between a head phrase of the first subtree and a head phrase of the second subtree is a difference in conjugation, or when the difference between a head phrase of the first subtree and a head phrase of the second subtree is a difference in notation.

Furthermore, the counting device according to the first aspect, may further comprise:

a phrase conversion part for converting a head phrase to an affirmative expression and a modifier phrase to a negative expression when, for the one subtree combination or each of the multiple subtree combinations, the end of a modifier phrase of a first subtree comprising the subtree combination is the particle "to" or "to ha", the modifier phrase of the first subtree includes a declinable word and includes an affirmative expression, there are no commas between the modifier phrase of the first subtree and the head phrase of the first subtree, and the head phrase of the first subtree includes a negative expression;

wherein for the one subtree combination or each of the multiple subtree combinations, the match determination part may determine whether or not the modifier phrase of the converted first subtree comprising the subtree combination and a modifier phrase of a second subtree comprising the subtree combination match, and whether or not the head phrase of the converted first subtree and the head phrase of the second subtree match.

Furthermore, in the counting device according to the first aspect, the input part may input a first sentence and a second sentence that are response sentences to questions; and for subtree combinations comprising a first subtree possessing a head phrase and a prescribed number of modifier phrases and a second subtree possessing a head phrase and the prescribed number of modifier phrases, within the one subtree combination or each of the multiple subtree combinations, the match determination part may determine that the head phrase possessed by the first subtree and the head phrase possessed by the second subtree match upon determining that each of the prescribed number of modifier phrases possessed by the first subtree respectively match the prescribed number of modifier phrases possessed by the second subtree.

In order to active the above objective, the counting program according to a second aspect of the present invention causes a computer to function as:

an input part for inputting a first sentence and a second sentence;

a syntax analyzing part for generating a syntax tree of the first sentence and a syntax tree of the second sentence by accomplishing syntax analysis on the first sentence and the second sentence;

a subtree generating part for generating one or multiple first subtrees that are subtrees comprising the first sentence, from the generated syntax tree of the first sentence, and generating one or multiple second subtrees that are subtrees comprising the second sentence, from the generated syntax tree of the second sentence;

a match determination part for determining whether or not a first expression represented by a first subtree comprising a subtree combination and a second expression represented by a second subtree comprising the subtree combination represent matching content, for one or multiple subtree combinations that are combinations or any one of the one or multiple first subtrees generated and one or multiple of the second subtrees generated;

a categorizing part for categorizing a first subtree representing a first expression and a second subtree representing a second expression into the same group for one combination of the first expression and the second expression determined to be representing matching content, or respective multiple combinations of the first expression and the second expression determined to be representing matching content; and, an output part for outputting the number of subtrees categorized into the group, or an expression respectively represented by one subtree or multiple subtrees categorized into the group.

In order to achieve the above objective, the computer-readable recording medium according to a third aspect of the present invention has recorded thereon a counting program for causing a computer to function as:

an input part for inputting a first sentence and a second sentence;

a syntax analyzing part for generating a syntax tree of the first sentence and a syntax tree of the second sentence by accomplishing syntax analysis on the first sentence and the second sentence;

a subtree generating part for generating one or multiple first subtrees that are subtrees comprising the first sentence, from the generated syntax tree of the first sentence, and generating one or multiple second subtrees that are subtrees comprising the second sentence, from the generated syntax tree of the second sentence;

a match determination part for determining whether or not a first expression represented by a first subtree comprising a subtree combination and a second expression represented by a second subtree comprising the subtree combination represent matching content, for one or multiple subtree combinations that are combinations or any one of the one or multiple first subtrees generated and one or multiple of the second subtrees generated;

a categorizing part for categorizing a first subtree representing a first expression and a second subtree representing a second expression into the same group for one combination of the first expression and the second expression determined to be representing matching content, or respective multiple combinations of the first expression and the second expression determined to be representing matching content; and, an output part for outputting the number of subtrees categorized into the group, or an expression respectively represented by one subtree or multiple subtrees categorized into the group.

In order to achieve the above objective, the counting method according to a fourth aspect of the present invention is method executed by a counting device comprising an input part, a syntax analyzing part, a subtree generating part, a match determination part, a categorizing part and an output part, the method including:

an input step in which the input part inputs a first sentence and a second sentence;

a syntax analysis step in which the syntax analyzing part generates a syntax tree of the first sentence and a syntax tree of the second sentence by accomplishing syntax analysis on the first sentence and the second sentence;

a subtree generation step in which the subtree generating part generates one or multiple first subtrees that are subtrees comprising the first sentence, from the generated syntax tree of the first sentence, and generates one or multiple second subtrees that are subtrees comprising the second sentence, from the generated syntax tree of the second sentence;

a match determination step in which the match determination part determines whether or not a first expression represented by a first subtree comprising a subtree combination and a second expression represented by a second subtree comprising the subtree combination represent matching content, for one or multiple subtree combinations that are combinations or any one of the one or multiple first subtrees generated and one or multiple of the second subtrees generated;

a categorization step in which the categorizing part categorizes a first subtree representing a first expression and a second subtree representing a second expression into the same group for one combination of the first expression and the second expression determined to be representing matching content, or respective multiple combinations of the first expression and the second expression determined to be representing matching content; and, an output step in which the output part outputs the number of subtrees categorized into the group, or an expression respectively represented by one subtree or multiple subtrees categorized into the group.

Advantageous Effects of Invention

With the counting device, counting program, computer-readable recording medium on which a counting program is recorded, and counting method according to the present invention, it is possible to count what expressions are used how many times in multiple input sentences.

BRIEF DESCRIPTION OF DRAWINGS

FIG. 2 is a drawing showing one example of a question screen;

FIG. 7A is a drawing showing one example of a full tree;

FIG. 7B is a drawing showing a first example of a subtree;

FIG. 7C is a drawing showing a second example of a subtree;

FIG. 7D is a drawing showing a third example of a subtree;

FIG. 7E is a drawing showing a fourth example of a subtree;

FIG. 7F is a drawing showing a fifth example of a subtree;

FIG. 7G is a drawing showing a sixth example of a subtree;

FIG. 8A is a drawing showing a first example of subtrees that completely match each other;

FIG. 8B is a drawing showing a second example of subtrees that completely match each other;

FIG. 10 is a drawing showing a third example of subtrees that effectively match each other;

FIG. 11 is a drawing showing one example of an input sentence table stored by the counting device in the first preferred embodiment;

FIG. 12 is a drawing showing one example of a phrase table stored by the counting device;

FIG. 13 is a drawing showing one example of a subtree table stored by the counting device;

FIG. 14A is a drawing showing one example of a notation table stored by the counting device;

FIG. 14B is a drawing showing one example of a synonym table stored by the counting device;

FIG. 14C is a drawing showing one example of a conjugation table stored by the counting device;

FIG. 15 is a drawing showing one example of a group table stored by the counting device;

FIG. 16 is a drawing showing one example of an inclusion relationship table stored by the counting device;

FIG. 17 is a drawing showing one example of a tier structure table stored by the counting device;

FIG. 18A is a drawing showing a full tree FT1;
FIG. 18B is a drawing showing a subtree PT10;
FIG. 18C is a drawing showing a subtree PT11;
FIG. 18D is a drawing showing a subtree PT12;
FIG. 18E is a drawing showing a subtree PT13;
FIG. 18F is a drawing showing a subtree PT14;
FIG. 18G is a drawing showing a subtree PT15;
FIG. 21A is a drawing showing a full tree FT4;
FIG. 21B is a drawing showing a full tree FT5;
FIG. 21C is a drawing showing a full tree FT6;
FIG. 21D is a drawing showing a subtree PT40;
FIG. 21E is a drawing showing a subtree PT50;
FIG. 21F is a drawing showing a subtree PT60;

FIG. 33 is a drawing showing one example of an input sentence table stored by the counting device in a fifth preferred embodiment;

FIG. 34A is a drawing showing a full tree FT11;
FIG. 34B is a drawing showing a subtree PT110;
FIG. 34C is a drawing showing a subtree PT111;
FIG. 34D is a drawing showing a subtree PT112;
FIG. 34E is a drawing showing a full tree FT12;
FIG. 34F is a drawing showing a subtree PT120;
FIG. 34G is a drawing showing a full tree FT13;
FIG. 34H is a drawing showing a subtree PT130;
FIG. 35A is a drawing showing a full tree FT14;
FIG. 35B is a drawing showing a subtree PT140;
FIG. 35C is a drawing showing a subtree PT141;
FIG. 35D is a drawing showing a full tree FT15;
FIG. 35E is a drawing showing a subtree PT150;
FIG. 35F is a drawing showing a subtree PT151;
FIG. 35G is a drawing showing a full tree FT16;
FIG. 35H is a drawing showing a subtree PT160;
FIG. 35I is a drawing showing a subtree PT161;
FIG. 36A is a drawing showing a full tree FT17;
FIG. 36B is a drawing showing a subtree PT170;
FIG. 36C is a drawing showing a subtree PT171;
FIG. 36D is a drawing showing a full tree FT18;
FIG. 36E is a drawing showing a subtree PT180;
FIG. 36F is a drawing showing a subtree PT181;

DESCRIPTION OF EMBODIMENTS

Below, the preferred embodiments of the present invention are described in detail with reference to the attached drawings.

First Preferred Embodiment

Figure 1:
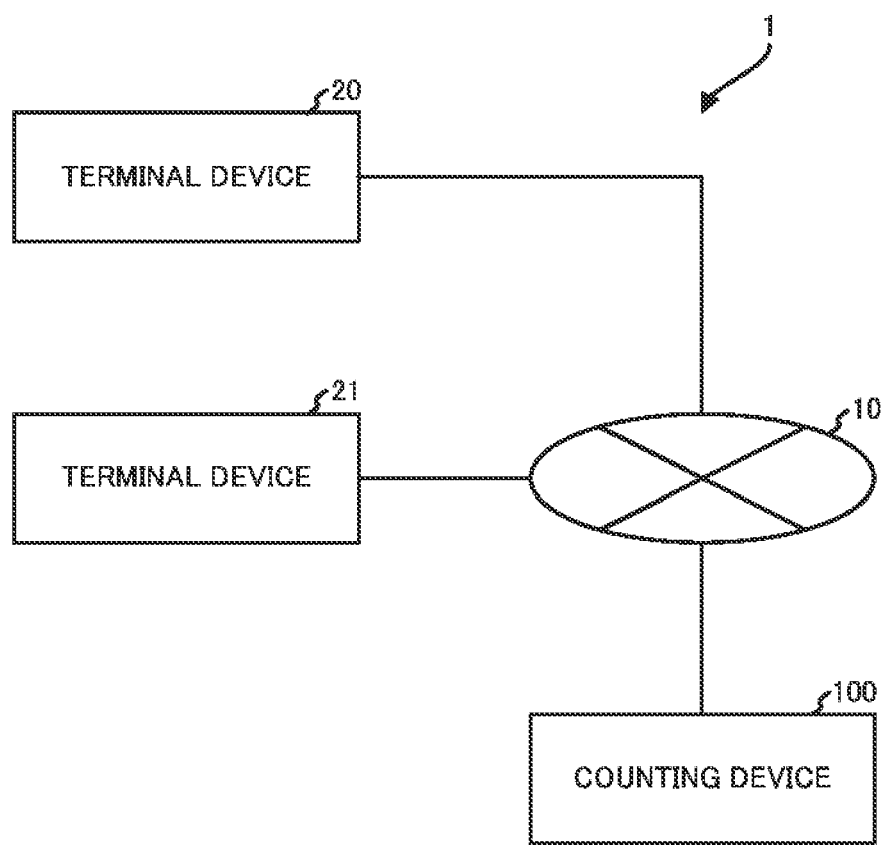
FIG. 1 is a system composition diagram showing a composition example of a counting system.

A counting device 100 according to a first preferred embodiment of the present invention is part of a counting system 1 as shown in FIG. 1. The counting system 1 counts user responses to surveys.

In addition to the counting device 100, the counting system 1 comprises a computer communication network 10 (hereafter simply called a communication network 10) and terminal devices 20 and 21.

The communication network 10 for example comprises the Internet. The communication network 10 may also comprise a LAN (Local Area Network) or a public circuit network.

The terminal devices 20 and 21 have mutually similar compositions and accomplish the same actions, so the explanation below will primarily describe the terminal device 20.

The terminal device 20 comprises, for example, personal computers provided with a display device such as an LCD (Liquid Crystal Display) and/or the like, and input parts such as a keyboard and a mouse.

Figure 3:
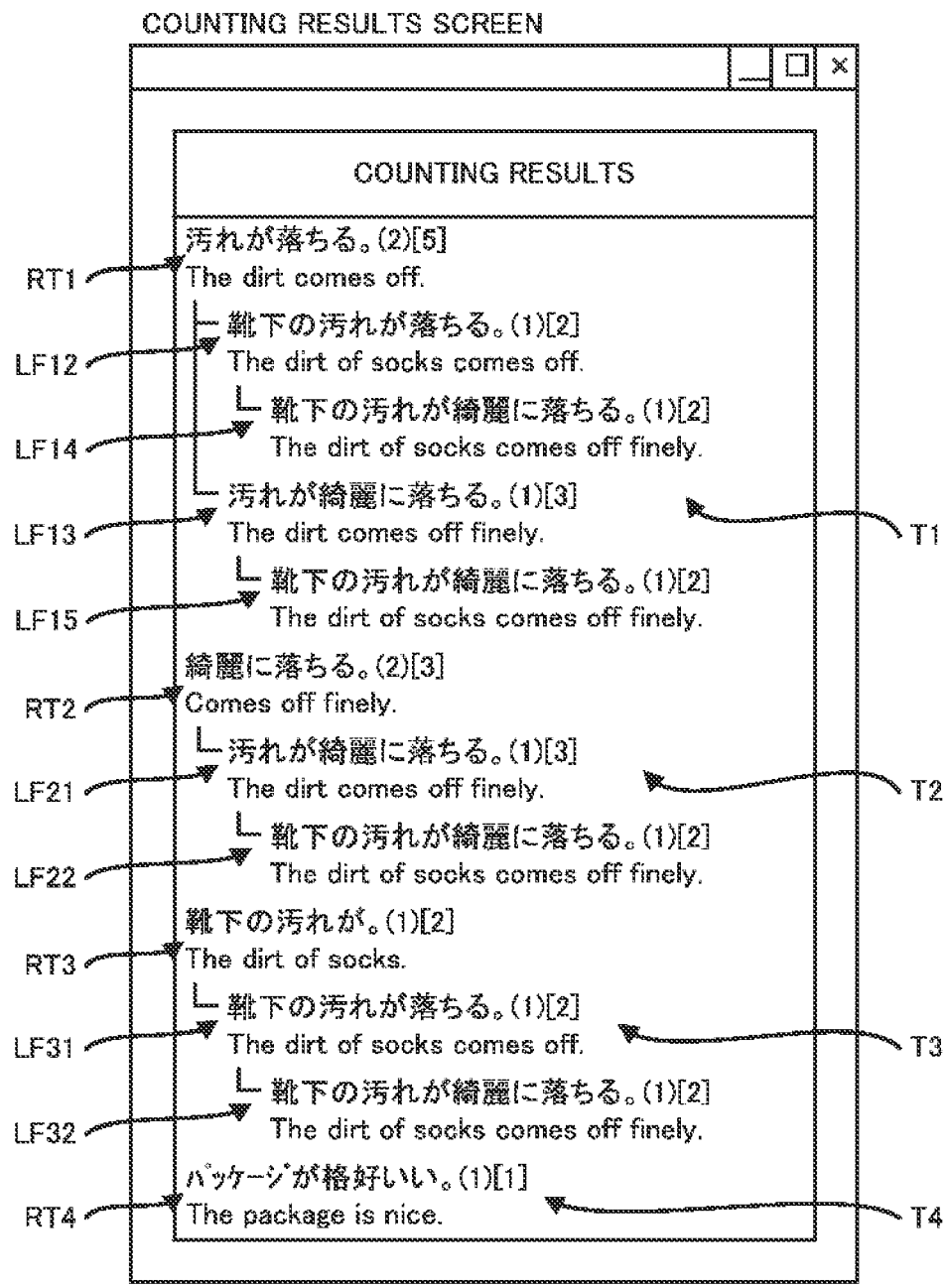
FIG. 3 is a drawing showing one example of a counting results screen in a first preferred embodiment.

The terminal device 20 displays a question screen displaying survey questions such as shown in FIG. 2. When the input parts are manipulated by the user, the terminal device 20 inputs the user's responses to the questions in accordance with the manipulation and transmits the input responses to the counting device 100. Following this, the terminal device 20 receives counting results for the responses from the counting device 100 and displays on the display device a counting results screen such as shown in FIG. 3, displaying the counting results received.

Figure 4:
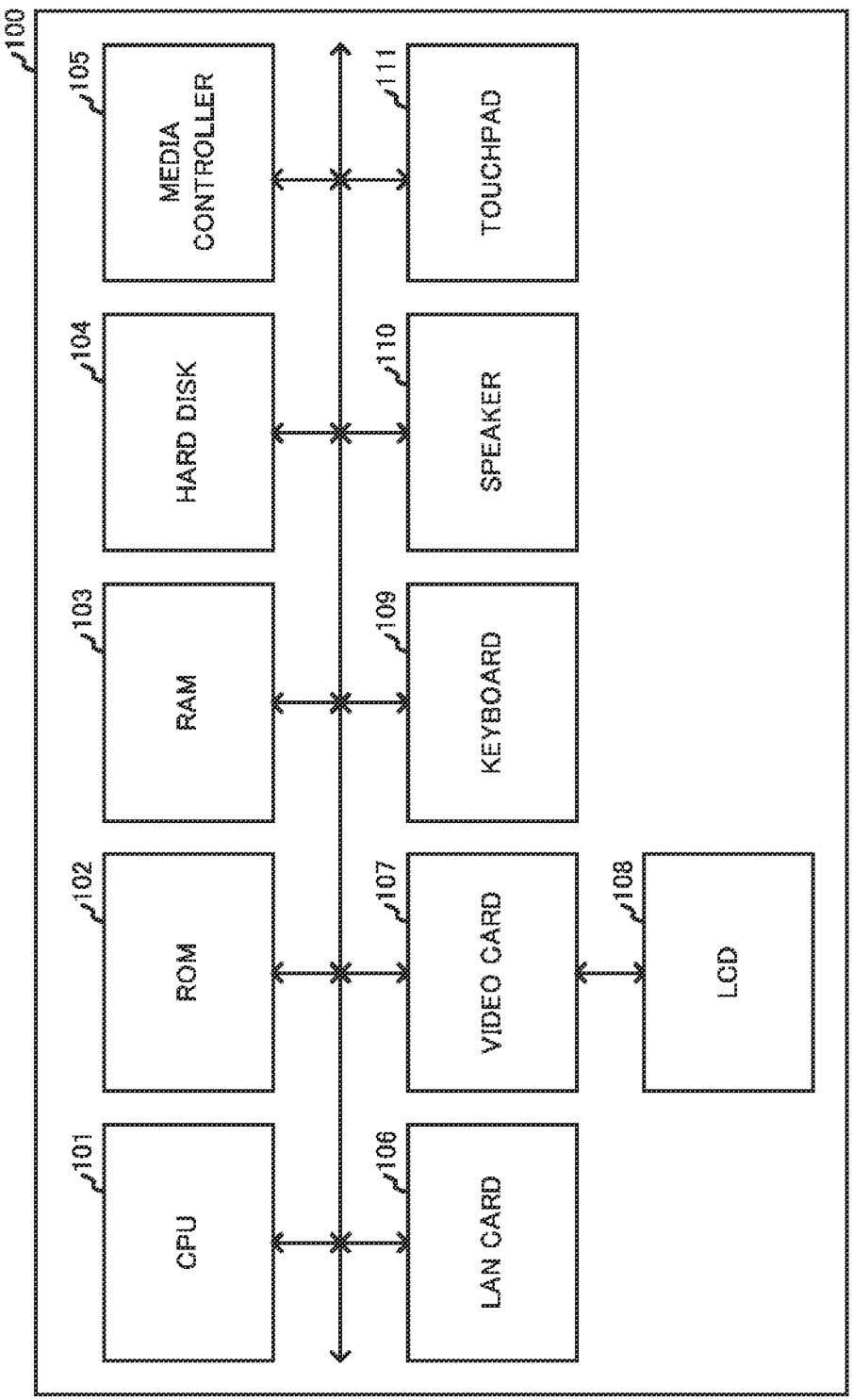
FIG. 4 is a hardware composition diagram showing one example of a counting device according to the preferred embodiment of the present invention.

The counting device 100 comprises a server such as shown in FIG. 4. The counting device 100 comprises a CPU (Central Processing Unit) 101, a ROM (Read Only Memory) 102, a RAM (Random Access Memory) 103, a hard disk 104, a media controller 105, a LAN (Local Area Network) card 106, a video card 107, an LCD (Liquid Crystal Display) 108, a keyboard 109, a speaker 110 and a touchpad 111.

The CPU 101 accomplishes complete control of the counting device by executing programs in accordance with programs stored in the ROM 102 or the hard disk 104. The RAM 103 is a work memory for temporarily storing data that is the target of processing, during execution of programs by the CPU 101.

The hard disk 104 is an information memory for storing tables preserving various types of data. The counting device 100 may be provided with a flash memory in place of the hard disk 104.

The media controller 105 reads various types of data and programs from recording media, including flash memory, CD (Compact Disc), DVD (Digital Versatile Disc) and Blu-ray Disc®.

The LAN card 106 sends and receives data between the terminal devices 20 and 21 connected via the communication network 10. The keyboard 109 and the touchpad 111 input signals in accordance with user manipulation.

The video card 107 depicts (that is to say, renders) images based on digital signals output from the CPU 101, and also outputs image signals showing the rendered images. The LCD 108 displays images in accordance with image signals output from the video card 107. The counting device 100 may be provided with a PDP (Plasma Display Panel) or EL (Electroluminescence) display in place of the LCD 108. The speaker 110 outputs audio based on signals output from the CPU 101.

Next, the functions possessed by the counting device 100 will be described.

Figure 5:
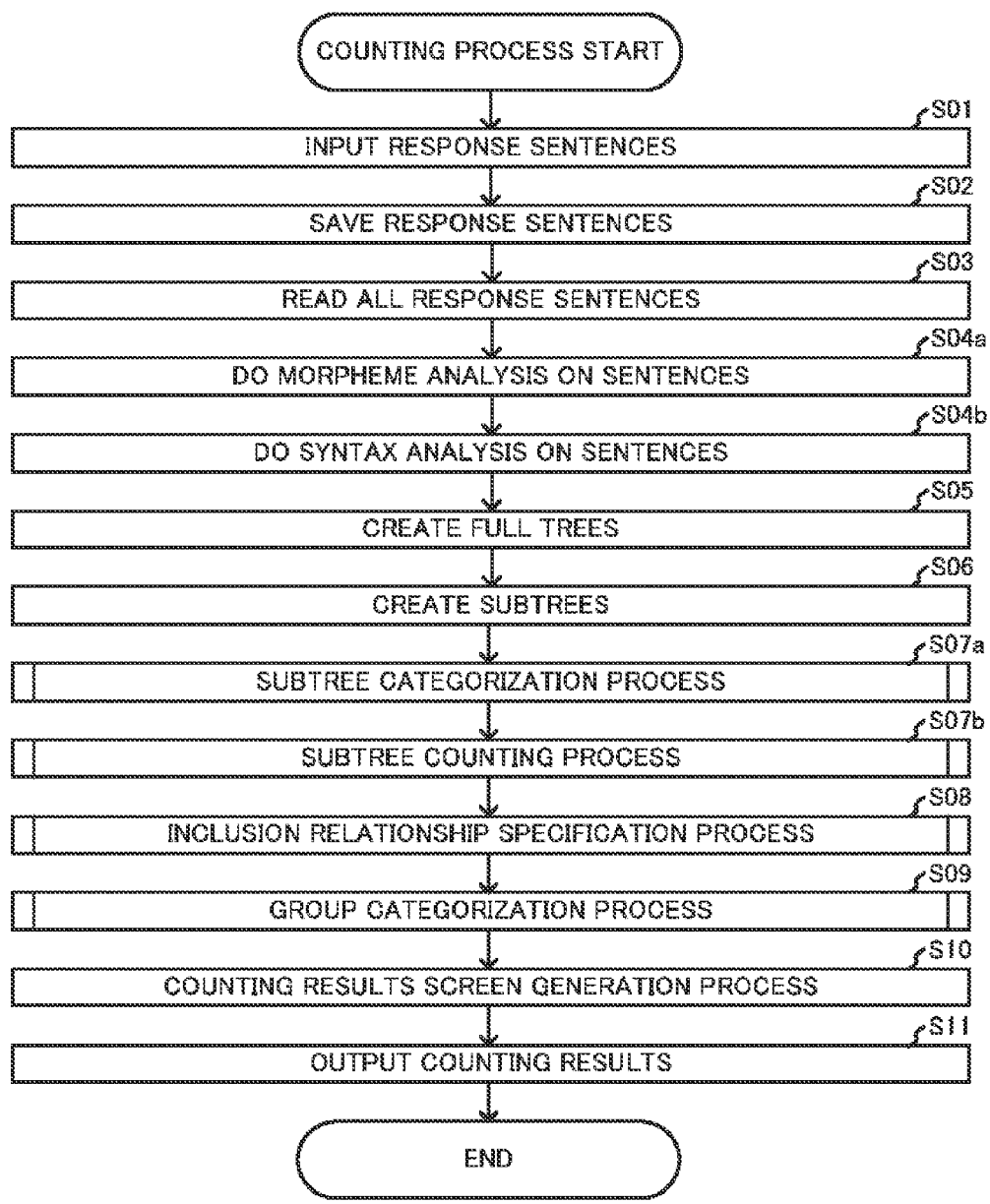
FIG. 5 is a flowchart showing one example of a counting process executed by the counting device according to the first preferred embodiment.
Figure 6:
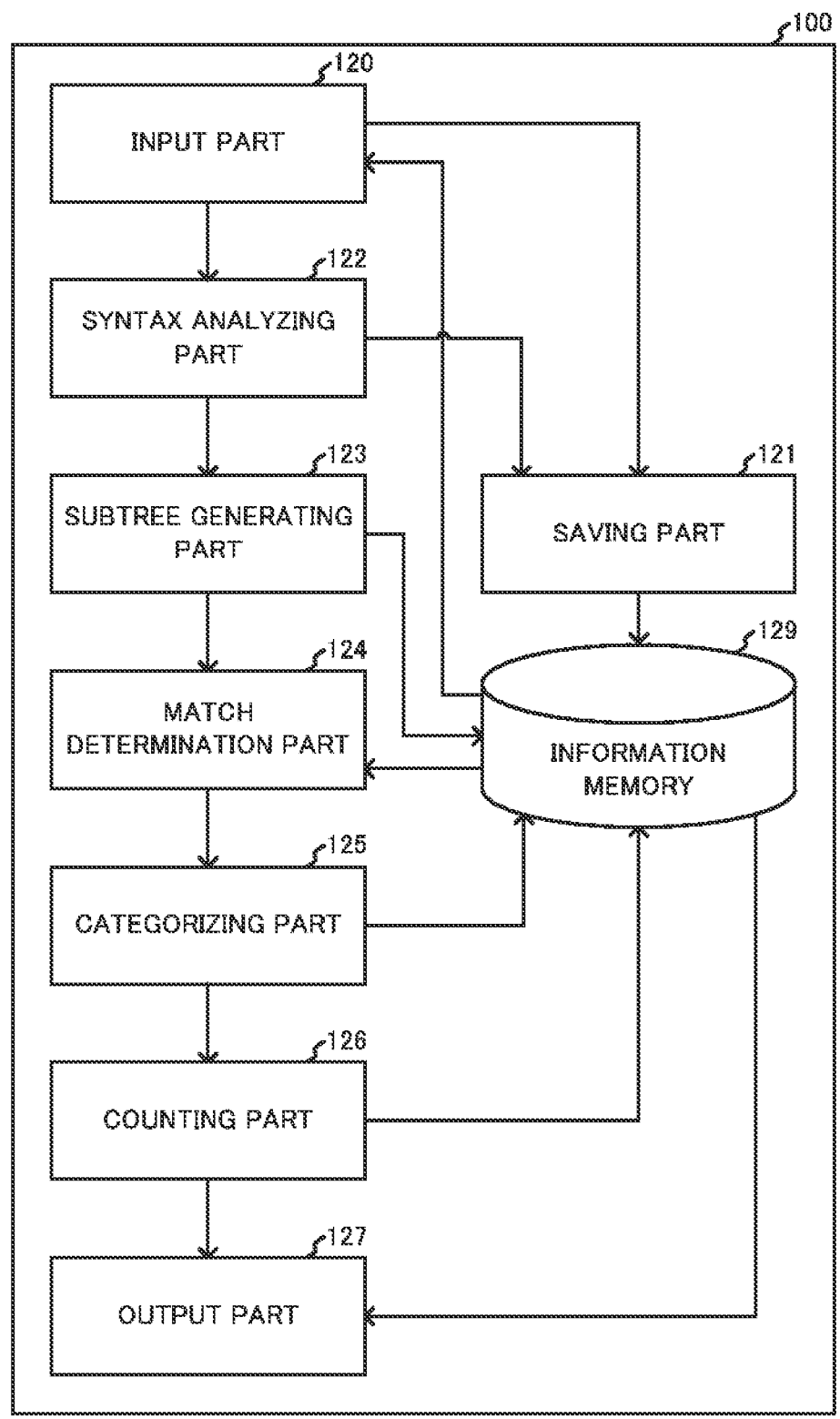
FIG. 6 is a function block diagram showing one example of functions possessed by the counting device according to the first preferred embodiment.

The CPU 101 executes the counting process shown in FIG. 5 for counting survey responses. Through this, the CPU 101 functions as an input part 120, a saving part 121, a syntax analyzing part 122, a subtree generating part 123, a match determination part 124, a categorizing part 125, a counting part 126 and an output part 127, as shown in FIG. 6. In addition, the CPU 101 functions as an information memory 129, in cooperation with the hard disk 104 shown in FIG. 4.

The input part 120 inputs a survey response sentence the LAN card 106 shown in FIG. 4 received from the terminal device 20 or 21. The saving part 121 saves the input sentence in the information memory 129. The syntax analyzing part 122 analyzes the syntax of the sentence stored in the information memory 129 and generates a syntax tree representing the sentence.

Here, the description of the functions possessed by the counting device 100 is temporarily interrupted and explanation of a syntax tree generated by the syntax analyzing part 122 is described, citing as an example the syntax tree shown in FIG. 7A.

The syntax tree shown in FIG. 7A is a syntax tree representing the sentence "The dirt of socks comes off finely." The root node of this syntax tree is the phrase "comes off", the child nodes of this root node are the phrase "the dirt" and "finely", and the child node of the phrase "the dirt" is the phrase "of socks". This is because the phrase "of socks" modifies the phrase "the dirt", and the phrase "the dirt" and the phrase "finely" modify the phrase "comes off".

A phrase modifying (that is to say, embellishing) another phrase in this manner is called a modifier phrase, and a phrase being modified by a modifier phrase (that is to say, embellished by a modifier phrase) is called a head phrase. In other words, the phrase "of socks" is a modifier phrase modifying the phrase "the dirt", and the phrase "the dirt" is a head phrase being modified by the phrase "of sock". In addition, the phrase "the dirt" and the phrase "finely" are modifier phrases modifying the phrase "comes off", and the phrase "comes off" is a head phrase being modified by the phrase "the dirt" and the phrase "finely".

The syntax tree shown in FIG. 7A has the two modifier phrases "the dirt" and "finely" modifying the head phrase "comes off". In the sentence "The dirt of socks comes off finely" represented by this syntax tree, the modifier phrase "finely" is used in a position closer to the head phrase "comes off" than the modifier phrase "the dirt". Consequently, in the syntax tree shown in FIG. 7A, the modifier phrase "finely" is closer to the head phrase "comes off" than is the modifier phrase "the dirt" (that is to say, below), and is represented by a higher-ranked node. That is to say, when the syntax tree has multiple modifier phrases modifying the same head phrase, in the sentence represented by the syntax tree high ranks are assigned in order from the modifier phrase used at a position close to the head phrase.

The counting device 100 counts survey questions represented by syntax trees. Below, the description of the functions possessed by the counting device 100 is resumed.

The subtree generating part 123 shown in FIG. 6 generates multiple partial syntax trees (hereafter called subtrees) of the syntax tree, from the syntax tree generated by the syntax analyzing part 122. In this specification, not only trees that partially match the syntax tree but also trees that completely match (hereafter called full trees) are called subtrees.

To explain citing as an example the syntax tree (full tree) representing the sentence "The dirt of socks comes off finely" shown in FIG. 7A, the subtree generating part 123 generates the subtrees shown in FIGS. 7B through 7G.

The subtrees respectively shown in FIGS. 7B through 7G represent all or part of the "The dirt of socks comes off finely" represented by the syntax tree shown in FIG. 7A.

The subtree shown in FIG. 7B is a syntax tree completely matching the full tree shown in FIG. 7A, and represents the whole sentence of "The dirt of socks comes off finely." The subtrees shown in FIGS. 7C through 7G represent portions of the sentence "The dirt of socks comes off finely" represented by the syntax tree.

Specifically, the subtree shown in FIG. 7C represents the sentence "The dirt of socks comes off", the subtree shown in FIG. 7D represents the sentence "The dirt comes off finely", the subtree shown in FIG. 7E represents the sentence "The dirt comes off", the subtree shown in FIG. 7F represents the sentence "Comes off finely" and the subtree shown in FIG. 7G represents the sentence "The dirt of socks".

The number of branches of the subtrees is smaller than or the same as the number of branches of the full tree, and the height of a subtree is shorter than or the same as the height of the full tree. In addition, all branches of the subtrees match any or all of the branches of the full tree.

As a concrete example, the subtree shown in FIG. 7B is a syntax tree fully matching the full tree shown in FIG. 7A, the number of branches and height of the subtree respectively match the number of branches and height of the full tree, and all branches possessed by the subtree match all branches possessed by the full tree.

In contrast, the height of the subtree shown in FIG. 7C matches the height of the full tree of FIG. 7A but the subtree does not possess a branch with words corresponding to the phrase "finely" possessed by the full tree. In addition, the subtree shown in FIG. 7D does not possess the phrase "of socks" possessed by the full tree of FIG. 7A, so the height of the subtree shown in FIG. 7D is shorter than the height of the full tree of FIG. 7A. Furthermore, the subtrees respectively shown in FIGS. 7E and 7F have fewer branches than the subtree shown in FIG. 7D. In addition, the height of the subtree shown in FIG. 7G is shorter than the height of the full tree of FIG. 7A.

The sentence "The dirt of socks comes off" represented by the subtree of FIG. 7C represents a superior concept to the sentence "The dirt of socks comes off 'finely'" represented respectively by the full tree of FIG. 7A and the subtree of FIG. 7B. That is because the sentence "The dirt of socks comes off" not only represents that the dirt of socks comes off "finely," but for example also represents that the dirt of socks comes off but does not come off finely.

In addition, the sentence "The dirt comes off finely" represented by the subtree of FIG. 7D represents a superior concept to the sentence "The dirt 'of socks' comes off finely" represented respectively by the full tree of FIG. 7A and the subtree of FIG. 7B. That is because the sentence "The dirt comes off finely" not only represents that the dirt "of socks" comes off finely, but for example also represents that the dirt "of the neck" comes off finely.

In this manner, subtrees representing superior concepts to the subtree that is the standard are called superior subtrees to the subtree that is the standard, and subtrees representing inferior concepts than the subtree that is the standard are called inferior subtrees to the subtree that is the standard.

In addition, the subtree of FIG. 7D has one fewer branches (that is to say, number of leaves) than the subtree of FIG. 7B. That is to say, the sentence "The dirt comes off finely" represented by the subtree of FIG. 7D has one fewer phrases comprising the sentence than does the sentence "The dirt 'of socks' comes off finely" represented by the subtree of FIG. 7B. Similarly, the subtree of FIG. 7C has fewer branches than the subtree of FIG. 7B and the sentence "The dirt of socks comes off" represented by the subtree of FIG. 7C has one fewer phrases comprising the sentence than does the sentence "The dirt of socks comes off 'finely'" represented by the subtree of FIG. 7B.

In this manner, subtrees with one fewer branch than the subtree that is the standard are called the closest superior subtrees of the subtree that is the standard, and subtrees having one more branch than the subtree that is the standard are called closest inferior subtrees of the subtree that is the standard.

The match determination part 124 of FIG. 6 determines whether or not the contents of the sentences respectively represented by the multiple subtrees generated by the subtree generating part 123 match each other, based on whether or not the phrases comprising the subtrees and the modifier-head relationship match (below, this is referred to as the subtrees matching).

To explain by citing a concrete example, the match determination part 124 determines that the first subtree and the second subtree as shown in FIG. 8A match each other completely. This is because the first subtree and the second subtree have the same height and number of branches, and respectively possess the root node phrase "comes off," the two phrases "the dirt" and "finely" modifying the root node, and the phrase "of socks" modifying the phrase "the dirt".

In addition, the match determination part 124 determines that the first subtree representing the sentence "The dirt of socks comes off finely" and the second subtree representing the sentence "Finely the dirt of socks comes off" match each other completely, as shown in FIG. 8B. That is to say, even though the sequence of the modifier phrases "The dirt" and "Finely" modifying the root node mutually differ between the first subtree and the second subtree, if the root node "comes off", the two modifier phrases "The dirt" and "Finely" modifying the root node and the phrase "of socks" modifying the modifier phrase "The dirt" mutually match, the match determination part 124 determines that the first subtree and the second subtree completely match. That is because in the sentence represented by the first subtree and the sentence represented by the second subtree, the notation order of the phrases "finely" and "the dirt" modifying "comes off" simply differs, and the meaning represented by the first subtree and the meaning represented by the second subtree are the same.

Figure 9A:
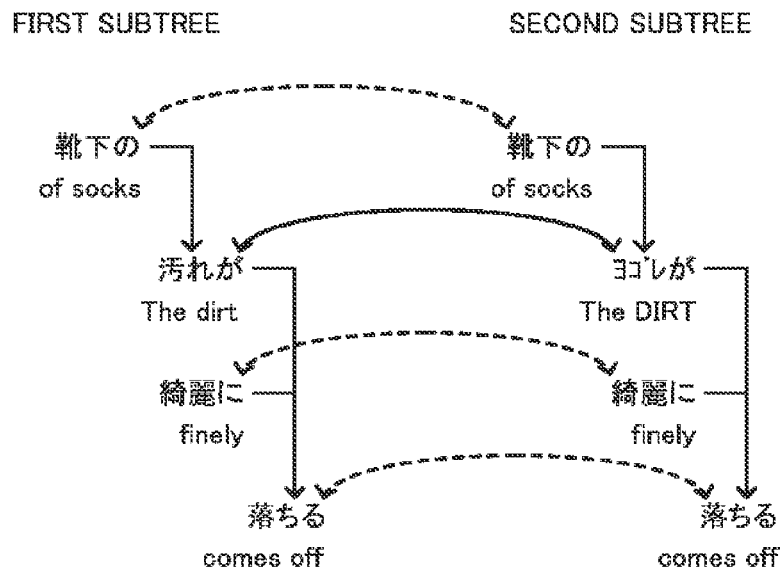
FIG. 9A is a drawing showing a first example of subtrees that effectively match each other.

Furthermore, the match determination part 124 determines that the first subtree representing "The dirt of socks comes off finely" and the second subtree representing "The DIRT of socks comes off finely" effectively match each other, as shown in FIG. 9A. That is because the word "dirt" can be written as "dirt" or "DIRT".

Figure 9B:
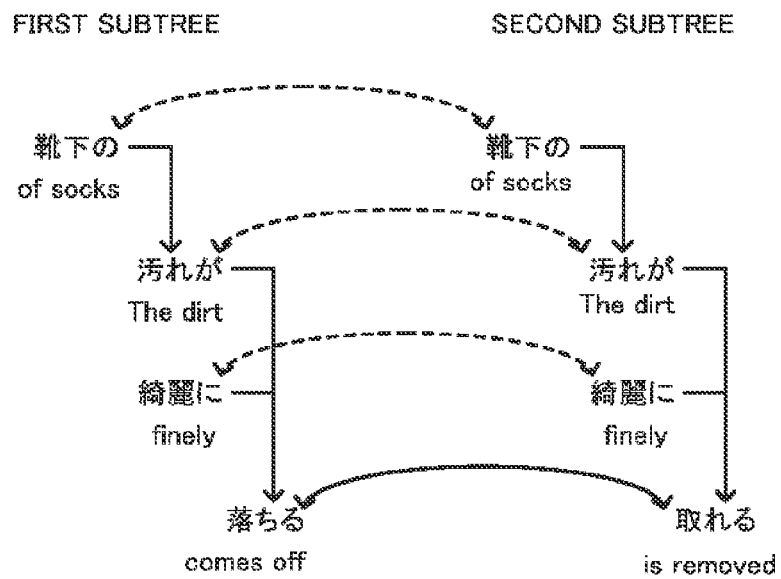
FIG. 9B is a drawing showing a second example of subtrees that effectively match each other.

In addition, the match determination part 124 determines that a first subtree representing "The dirt of socks comes off finely" and a second subtree representing "The dirt of socks is removed finely" effectively match each other, as shown in FIG. 9B. That is because the words "comes off" and "is removed" are synonyms. As a similar example, the match determination part 124 determines that a subtree representing "detergent that finely takes off the dirt" and a subtree representing "detergent that finely removes the dirt" effectively match each other. In other words, phrases that have a mutual synonymous relationship may be modifier phrases or head phrases.

In addition, the match determination part 124 determines that a first subtree representing "The dirt of socks comes off finely" and a second subtree representing "The dirt of socks came off finely" effectively match each other, as shown in FIG. 10. This is because inflectable words such as the verb have been conjugated. As a similar example, the match determination part 124 determines that a subtree representing "the joy that the dirt comes off finely" and a subtree representing "the joy that the dirt came off finely" also effectively match each other. In other words, phrases in which conjugation differs may be modifier phrases or head phrases.

The categorizing part 125 of FIG. 6 groups subtrees based on the determination results of the match determination part 124. The counting part 126 counts the number of subtrees categorized in each group. The output part 127 outputs the counting results to the LAN card 106. The LAN card 106 returns the counting results to the terminal device 20 or 21.

Next, the various types of tables stored by the information memory 129 are explained with reference to FIGS. 11 through 16.

The information memory 129 stores an input sentence table shown in FIG. 11, storing sentences input by the input part 120. In the input sentence table are stored multiple sentence IDs identifying sentences and sentences identified by the IDs, associated with each other.

In addition, the information memory 129 stores a phrase table shown in FIG. 12, storing phrases contained in the sentences of the input sentence table. In the phrase table, sentence IDs stored in the input sentence table, phrases contained in the sentences identified by the sentence IDs, and phrase IDs identifying the phrases are stored in multiple, associated with each other.

Furthermore, the information memory 129 stores a subtree table shown in FIG. 13, storing subtrees comprising phrases in the phrase table. In the subtree table, sentence IDs stored in the input sentence table, subtree IDs identifying the subtrees of the sentences identified by the sentence IDs, phrases comprising the subtrees, phrase IDs of the phrases and phrase IDs of head phrases being modified by the phrases (hereafter called head phrase IDs) are stored in multiple, associated with each other.

Furthermore, the information memory 129 stores a notation table shown in FIG. 14A, a synonym table shown in FIG. 14B and a conjugation table shown in FIG. 14C. The tables shown in FIGS. 14A through 14C are used for the match determination part 124 determining whether or not multiple subtrees are effectively the same. In the notation table, notation of words and notations differing from those notations of the words are stored in multiple, associated with each other. In the synonym table, words and synonyms of those words are stored in multiple, associated with each other. In the conjugation table, conjugations of words and conjugations differing from the word conjugations are stored in multiple, associated with each other.

Two words with different notations associated with each other in the notation table, two synonyms associated with each other in the synonym table and two words with different conjugations associated with each other in the conjugation table are respectively considered effectively matching (or, effectively the same) words.

In addition, the information memory 129 stores a group table shown in FIG. 15 in which are stored groups with subtrees of the subtree table categorized. In this group table, group IDs identifying the groups, subtree IDs for subtrees categorized into the groups, the heights of the subtrees, the total number of branches of the subtrees, subtrees representing the group (hereafter called representative trees), the names of the groups, a count of subtrees representing sentences completely matching the names of the groups (hereafter called group name matching tree count) and the total number of subtrees categorized into the groups, are stored, associated with each other.

When in a given group a subtree representing an inferior concept to a subtree categorized in a group that is a given standard is categorized, the group is considered an inferior group to the group that is the standard. In addition, concepts represented by subtrees categorized into the group that is the standard contain concepts represented by subtrees categorized into groups inferior to the group that is the standard. That is because superior concepts include inferior concepts.

Consequently, the information memory 129 stores an inclusion relationship table shown in FIG. 16, where data representing the inclusion relationship of groups (that is to say, superior and inferior relationships) are stored. In the inclusion relationship table, group IDs stored in the group table and IDs of the closest superior groups to the groups identified by the group IDs (hereafter called the closest superior group IDs) are stored, associated with each other.

A set constituting multiple groups into which subtrees representing common concepts are respectively categorized is called a group set. Multiple groups belonging to a group set mutually comprise a tier structure because of having superior and inferior relationships respectively, as discussed above.

Consequently, the information memory 129 stores a tier structure table shown in FIG. 17, in which is stored data representing the tier structure of the groups. In the tier structure table, group IDs stored in the group table, group set IDs identifying group sets to which groups identified by the group IDs belong, and closest superior group IDs of the closest superior groups to the groups identified by the group IDs are stored, associated with each other.

Next, the actions of the CPU 101 accomplished by the input part 120, the saving part 121, the syntax analyzing part 122, the subtree generating part 123, the match determination part 124, the categorizing part 125, the counting part 126 and the output part 127 shown in FIG. 6 are described.

The explanation takes as an example a case in which the counting device 100 has received a survey response sentence of "The dirt of socks comes off finely."

The CPU 101 begins execution of the counting process shown in FIG. 5 upon receiving a response sentence from the terminal device 20.

First, the input part 120 inputs a response sentence of "The dirt of socks comes off finely" from the LAN card 106 of FIG. 4 (step S01).

Next, the saving part 121 generates a sentence ID identifying the input response sentence "The dirt of socks comes off finely", and saves this in the input sentence table shown in FIG. 11, associated with the sentence "The dirt of socks comes off finely" (step S02).

The explanation assumes that the following six sentences are stored in the input sentence table when the process of step S02 has ended.

The sentence "The dirt of socks comes off finely" identified by a sentence ID "ST1", the sentence "The dirt of socks is removed finely" identified by a sentence ID "ST2", the sentence "The DIRT comes off finely" identified by a sentence ID "ST3", the sentence "The dirt came off" identified by a sentence ID "ST4", the sentence "The dirt comes off" identified by a sentence ID "ST5", and the sentence "The package is nice" identified by a sentence ID "ST6".

Following step S02 in FIG. 5, the input part 120 reads all response sentences stored in the input sentence table (step S03).

Next, the syntax analyzing part 122 acquires morpheme strings of the sentences by accomplishing morpheme analysis on the six sentences read by the input part 120 (step S04a).

Next, the syntax analyzing part 122 accomplishes syntax analysis on the morpheme string obtained through morpheme analysis (step S04b). In this manner, the syntax analyzing part 122 specifies multiple phrases comprising the aforementioned six input sentences from the morpheme string of the aforementioned six input sentences.

Following this, the saving part 121 saves the sentence IDs identifying the sentences, the phrase IDs of phrases obtained from the sentences, and the phrases, associated together, in the phrase table shown in FIG. 12.

In addition, the syntax analyzing part 122 generates a full syntax tree (that is to say, a full tree) FT1 shown in FIG. 18A using the multiple phrases comprising the sentence "The dirt of socks comes off finely" identified by the sentence ID "ST1". Similarly, the syntax analyzing part 122 generates full trees FT2 to FT6 respectively shown in FIGS. 19A, 20A, and 21A to 21C from the sentences respectively identified by the sentence IDs "ST2" to "ST6" (step S05).

Next, the subtree generating part 123 generates subtrees PT10 to PT15 (that is to say, all subtrees) shown in FIGS. 18B to 18G, from the full tree FT1 shown in FIG. 18A. Similarly, the subtree generating part 123 generates subtrees PT20 to PT25 shown in FIGS. 19B to 19G, from the full tree FT2 shown in FIG. 19A. Furthermore, the subtree generating part 123 generates subtrees PT30 to PT32 shown in FIGS. 20B to 20D from the full tree FT3 shown in FIG. 20A. In addition, the subtree generating part 123 generates subtrees PT40, PT50 and PT60 shown in FIGS. 21D to 21F, from the full trees FT4 to FT6 shown in FIGS. 21A to 21C (step S06 of FIG. 5).

Following this, for the multiple subtrees generated in step S06, the saving part 121 of FIG. 6 associates the sentences IDs used in generating the subtrees, the subtree IDs identifying the subtrees, phrases comprising the subtrees, phrase IDs of the phrases, and head phrase IDs of phrases being modified by the phrases, and saves this information in the subtree table shown in FIG. 13.

Figure 22:
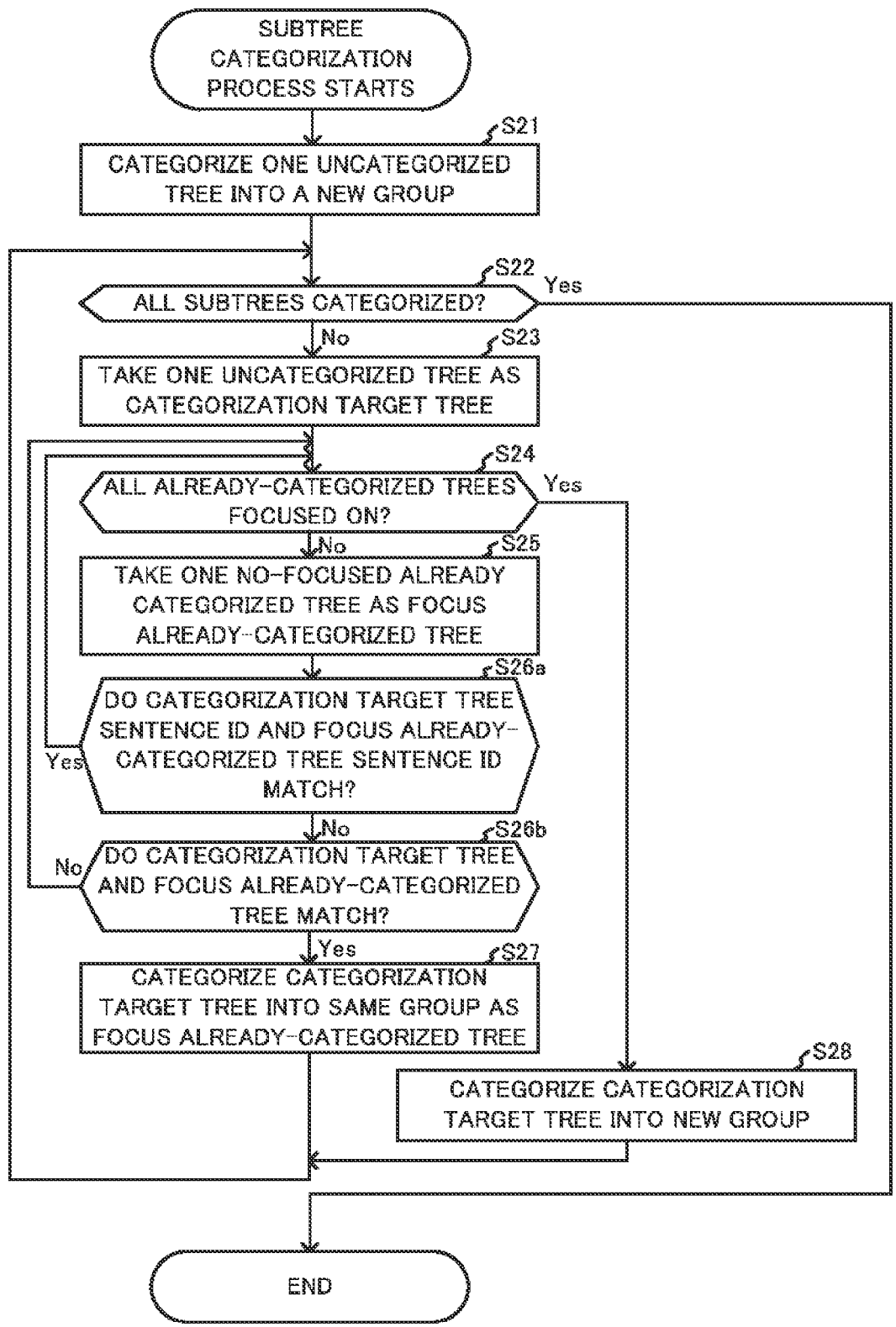
FIG. 22 is a flowchart showing one example of a subtree categorization process executed by the counting device.

After the subtrees are generated by the process of step S06 of FIG. 5, the generated subtrees are grouped and a subtree categorization process shown in FIG. 22 is executed (step S07a).

When the subtree categorization process begins, the categorizing part 125 generates a new group and then references the subtree table shown in FIG. 13. Next, the categorizing part 125 categorizes one of the subtrees not yet categorized into a group (hereafter called an uncategorized tree), from among the subtrees identified by subtree IDs stored in the subtree table, into a new group (step S21).

At this time, all subtrees identified by subtree IDs stored in the subtree table are uncategorized trees. Here the explanation assumes that the categorizing part 125 selects the subtree ID "PT10" stored at the front of the subtree table and categorizes the subtree PT10 shown in FIG. 18B identified by the selected ID into a new group G10.

Next, the saving part 121 saves the subtree ID "PT10" of the subtree PT10 and the group ID "G10" of the group G10 in the group table shown in FIG. 15, associating these together. At this time, the saving part 121 further associates the height "2" and the total branch count "3" of the subtree PT10 shown in FIG. 18B to the subtree ID "PT10" of the subtree PT10 and the group ID "G10" of the group G10. This is in order to make it easy to search for groups superior to the group G10.

Next, the categorizing part 125 determines whether or not all of the subtrees stored in the subtree table of FIG. 13 have been categorized into one of the groups (step S22 of FIG. 22). At this time, the categorizing part 125 has not yet categorized subtrees PT11 to PT15, PT20 to PT25, PT30 to PT32, PT40, PT50 and PT60, so it is determined that all subtrees have not been categorized into groups (step S22; No).

Following this, the categorizing part 125 takes one of the uncategorized trees as a categorization target tree to be a subtree categorized into a group (step S23).

Here, the explanation assumes that the categorizing part 125 selects the subtree PT11 shown in FIG. 18C as the categorization target tree, from among the uncategorized subtrees PT11 to PT15, PT20 to PT25, PT30 to PT32, PT40, PT50 and PT60.

Next, the categorizing part 125 determines whether or not all subtrees already categorized into groups (hereafter called already-categorized trees) have been focused on (step S24). At this time, the already-categorized tree is only the subtree PT10 and the subtree PT10 has not yet been focused on. Consequently, the categorizing part 125 determines that all already-categorized trees have not been focused on (step S24 of FIG. 21; No).

Following this, the categorizing part 125 focuses on one of the unfocused already-categorized trees and makes this a focus already-categorized tree (step S25). Here, the explanation assumes that the categorizing part 125 focusses on the already-categorized tree PT10 shown in FIG. 18B.

Next, the match determination part 124 finds the sentence ID "ST1" associated with the subtree ID "PT11" of the categorization target tree PT11 of FIG. 18C (hereafter called the sentence ID of the categorization target tree PT11) from the subtree table shown in FIG. 13. In addition, the match determination part 124 searches for the sentence ID associated with the subtree ID "PT10" of the focus already-categorized tree PT10 of FIG. 18B (hereafter called the sentence ID of the focus already-categorized tree PT10) "ST1" from the subtree table. Following this, the match determination part 124 determines that the sentence ID "ST1" of the categorization target tree PT11 and the sentence ID "ST1" of the focus already-categorized tree PT10 match (step S26a; Yes), and then returns to step S24 and repeats the above-described process. This is because the subtree generating part 123 does not generate the same subtree from the same sentence, so two subtrees generated from the same sentence do not match.

Following this, the process returns to step S24 in FIG. 22 and the categorizing part 125 determines whether or not all categorized trees have been focused on (step S24). At this time, the only already-categorized tree is the subtree PT10, and the subtree PT10 has already been focused on. Consequently, the categorizing part 125 determines that all already-categorized trees have been focused on (step S24; Yes).

Next, the categorizing part 125 generates a new group and categorizes the categorization target trees in the generated group (step S28). Here, the explanation assumes that the categorizing part 125 generates a new group G11 and categorizes the categorization target tree PT11 of FIG. 18C into the group G11. This is because the categorization target tree PT11 does not match any of the already-categorized trees categorized into existing groups, so the tree should not be categorized into the existing groups.

Next, the saving part 121 associates the group ID "G11" of the group G11, the subtree ID "PT11" of the categorization target tree PT11, the height "2" of the categorization target tree PT11 and the number of branches "2" with each other and saves this information in the group table shown in FIG. 15.

The explanation assumes that following this the categorizing part 125 takes the order of the categorization target trees to be from subtree PT12 to subtree PT15 from FIGS. 18D to 18G. The categorizing part 125 repeatedly executes the steps from step S22 to step S26b and step S28 of FIG. 22. Through this, the categorizing part 125 generates new groups G12 to G15 and categorizes subtrees from PT12 to PT15 respectively into these groups G12 to G15.

Figure 19A:
FIG. 19A is a drawing showing a full tree FT2.
Figure 19B:
FIG. 19B is a drawing showing a subtree PT20.
Figure 19C:
FIG. 19C is a drawing showing a subtree PT21.
Figure 19D:
FIG. 19D is a drawing showing a subtree PT22.
Figure 19E:
FIG. 19E is a drawing showing a subtree PT23.
Figure 19F:
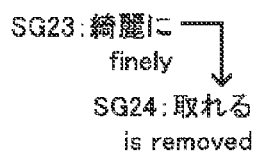
FIG. 19F is a drawing showing a subtree PT24.
Figure 19G:
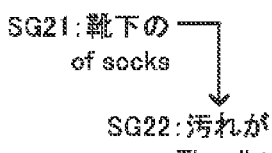
FIG. 19G is a drawing showing a subtree PT25.

Next, the explanation assumes that the categorizing part 125 takes an uncategorized tree PT20 shown in FIG. 19B as the categorization target tree and the already-categorized tree PT10 shown in FIG. 18B as the focus already-categorized tree. After the categorizing part 125 has executed from step S22 to step S25 in FIG. 22, the match determination part 124 determines that the sentence ID "ST2" of the already categorization target tree PT20 and the sentence ID "ST1" of the focus already-categorized tree PT10 are different (step S26a; No), and executes the process of step S26b.

In step S26b, the match determination part 124 determines whether or not the categorization target tree PT20 of FIG. 19B and the focus already-categorized tree PT10 of FIG. 18B completely match or effectively match (hereafter simply referred to as matching) (step S26b).

Here, the match determination part 124 does not determine that the categorization target tree PT20 representing the sentence "The dirt of socks is removed finely" and the focus already-categorized tree PT10 representing the sentence "The dirt of socks comes off finely" completely match. That is because the root node "is removed" of the categorization target tree PT20 and the root node "comes off" of the focus already-categorized tree PT10 are different.

Next, the match determination part 124 determines that "is removed" is a synonym for "comes off" because "is removed" and "comes off" are stored associated with each other in the synonym table of FIG. 14B. Consequently, the match determination part 124 determines that the categorization target tree PT20 and the focus already-categorized tree PT10 effectively match (step S26b of FIG. 22; Yes).

Following this, the categorizing part 125 categorizes the categorization target tree PT20 of FIG. 19B into the group G10 in which the focus already-categorized tree PT10 of FIG. 18B is categorized (step S27).

Next, the saving part 121 saves the subtree ID "PT20" of the subtree PT20 and the group ID "G10" of the group G10 in the group table shown in FIG. 15, associated with each other.

Next, the explanation assumes that the categorizing part 125 categorizes categorization target trees in order from the subtree PT21 through PT25 in FIGS. 19C to 19G. The categorizing part 125 repeatedly executes step S22 to step S27 of FIG. 22. Through this, the categorizing part 125 respectively categorizes the subtrees PT21 to PT25 into existing groups G11 to G15 into which the subtrees PT11 to PT15 of FIGS. 18C to 18G have been categorized.

Figure 20A:
FIG. 20A is a drawing showing a full tree FT3.
Figure 20B:
FIG. 20B is a drawing showing a subtree PT30.

Next, the explanation assumes that the categorizing part 125 takes the uncategorized tree PT30 shown in FIG. 20B as the categorization target and the already-categorized trees PT10 and PT11 of FIGS. 18B and 18C in order as focus already-categorized trees. The categorizing part 125 repeats the processes of steps S22 to S26 of FIG. 22.

Next, the explanation assumes that the categorizing part 125 takes the already-categorized tree PT12 shown in FIG. 18D as the focus already-categorized tree. After the categorizing part 125 has executed the processes from step S22 to step S26a, the match determination part 124 determines whether or not the categorization target tree PT30 of FIG. 20B and the focus already-categorized tree PT12 of FIG. 18D match (step S26b).

Here, the match determination part 124 determines that the categorization target tree PT30 representing the sentence "The DIRT is removed finely" and the focus already-categorized tree PT12 representing the sentence "The dirt comes off finely" do not completely match. That is because the modifier phrase "The DIRT" modifying the root node of the categorization target tree PT30 and the modifier phrase "The dirt" modifying the root node of the focus already-categorized tree PT12 are different.

Next, the match determination part 124 determines that the difference between the phrases is nothing more than a notational difference because "the DIRT" and "the dirt" are stored associated with each other in the notation table of FIG. 14A. Consequently, the match determination part 124 determines that the categorization target tree PT30 and the focus already-categorized tree PT12 effectively match (step S26b of FIG. 22; Yes).

Following this, the categorizing part 125 categorizes the categorization target tree PT30 into the same group G12 as the focus already-categorized tree PT12 (step S27).

Next, the saving part 121 saves the subtree ID "PT30" of the subtree PT30 and the group ID "G12" of the group G12 in the group table shown in FIG. 15.

Figure 20C:
FIG. 20C is a drawing showing a subtree PT31.

Following this, the explanation assumes that the categorizing part 125 takes the subtree PT31 shown in FIG. 20C as the categorization target tree. The categorizing part 125 executes step S22 to step S27 of FIG. 22, and through this categorizes the subtree PT31 into the existing group G13 in which the subtree PT13 of FIG. 18E has been categorized.

Figure 20D:
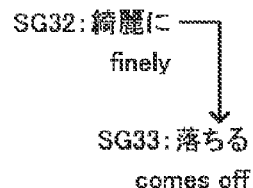
FIG. 20D is a drawing showing a subtree PT32.

Next, the explanation assumes that the categorizing part 125 takes the uncategorized tree PT32 shown in FIG. 20D as a categorization target tree and takes the already-categorized trees PT10 to PT13 of FIGS. 18B to 18E in order as focus already-categorized trees. The categorizing part 125 repeats the processes from step S22 to step S26b of FIG. 22.

Next, the explanation assumes that the categorizing part 125 takes the already-categorized tree PT14 of FIG. 18F as the focus already-categorized tree. The categorizing part 125 executes the processes from step S22 to step S26b of FIG. 22 and then the match determination part 124 determines whether or not the categorization target tree PT32 of FIG. 20D and the focus already-categorized tree PT14 of FIG. 18F match (step S26b).

Here, the match determination part 124 determines that the categorization target tree representing the sentence "comes off finely" and the focus already-categorized tree PT14 representing the sentence "comes off finely" completely match. This is because the modifier phrase "finely" and the head phrase "comes off" of the categorization target tree PT32, and the modifier phrase "finely" and the head phrase "comes off" of the focus already-categorized tree PT14, match.

Following this, the categorizing part 125 categorizes the categorization target tree PT32 into the same group G14 as the focus already-categorized tree PT14 (step S27). Next, the saving part 121 saves the subtree ID "PT32" of the categorization target tree PT32 and the group ID "G14" of the group G14 in the group table shown in FIG. 15, associated with each other. At this time, the categorizing part 125 saves the subtree IDs "PT14" and "PT32" in the group table linked by the symbol "=" representing the fact that the subtree PT14 and the subtree PT32 completely match.

Next, the explanation assumes that the categorizing part 125 takes an uncategorized tree PT40 shown in FIG. 21D as the categorization target tree, and the already-categorized trees PT10 to PT12 in order as the focus already-categorized trees. The categorizing part 125 repeats the processes from step S22 to step S26*b* of FIG. 22.

Next, the explanation assumes that the categorizing part 125 takes the already-categorized tree PT13 shown in FIG. 18E as the focus already-categorized tree. The categorizing part 125 executes the processes from step S22 to step S26*b* of FIG. 22, and then the match determination part 124 determines whether or not the categorization target tree PT40 of FIG. 21 and the focus already-categorized tree PT13 of FIG. 18E match (step S26*b*).

Here, the match determination part 124 determines that the categorization target tree PT40 representing the sentence "The dirt came off" and the focus already-categorized tree PT13 representing the sentence "The dirt comes off" do not completely match. This is because the root note "came off" of the categorization target tree PT40 and the root node "comes off" of the focus already-categorized tree PT13 are different.

Next, the match determination part 124 determines that the difference between the root nodes is nothing more than a difference in conjugation, because "came off" and "comes off" are stored associated with each other in the conjugation table of FIG. 14C. Consequently, the match determination part 124 determines that the categorization target tree PT40 and the focus already-categorized tree PT13 effective match (step S26*b* of FIG. 22; Yes).

Following this, the categorizing part 125 categorizes the categorization target tree PT40 into the same group G13 as the focus already-categorized tree PT13 (step S27).

Following this, the explanation assumes that the categorizing part 125 takes the subtree PT50 shown in FIG. 21E as the categorization target tree. The categorizing part 125 executes step S22 to step S27, and categorizes the subtree PT50 into the existing group G13.

Following this, the explanation assumes that the categorizing part 125 takes the subtree PT60 shown in FIG. 21F as the categorization target tree. The categorizing part 125 executes step S22 to step S26*b* and step S28, and through this categorizes the subtree PT60 into a new group G16.

Next, when the categorizing part 125 determines that all subtrees have been categorized (step S22; Yes), execution of the subtree categorization process ends.

Figure 23:
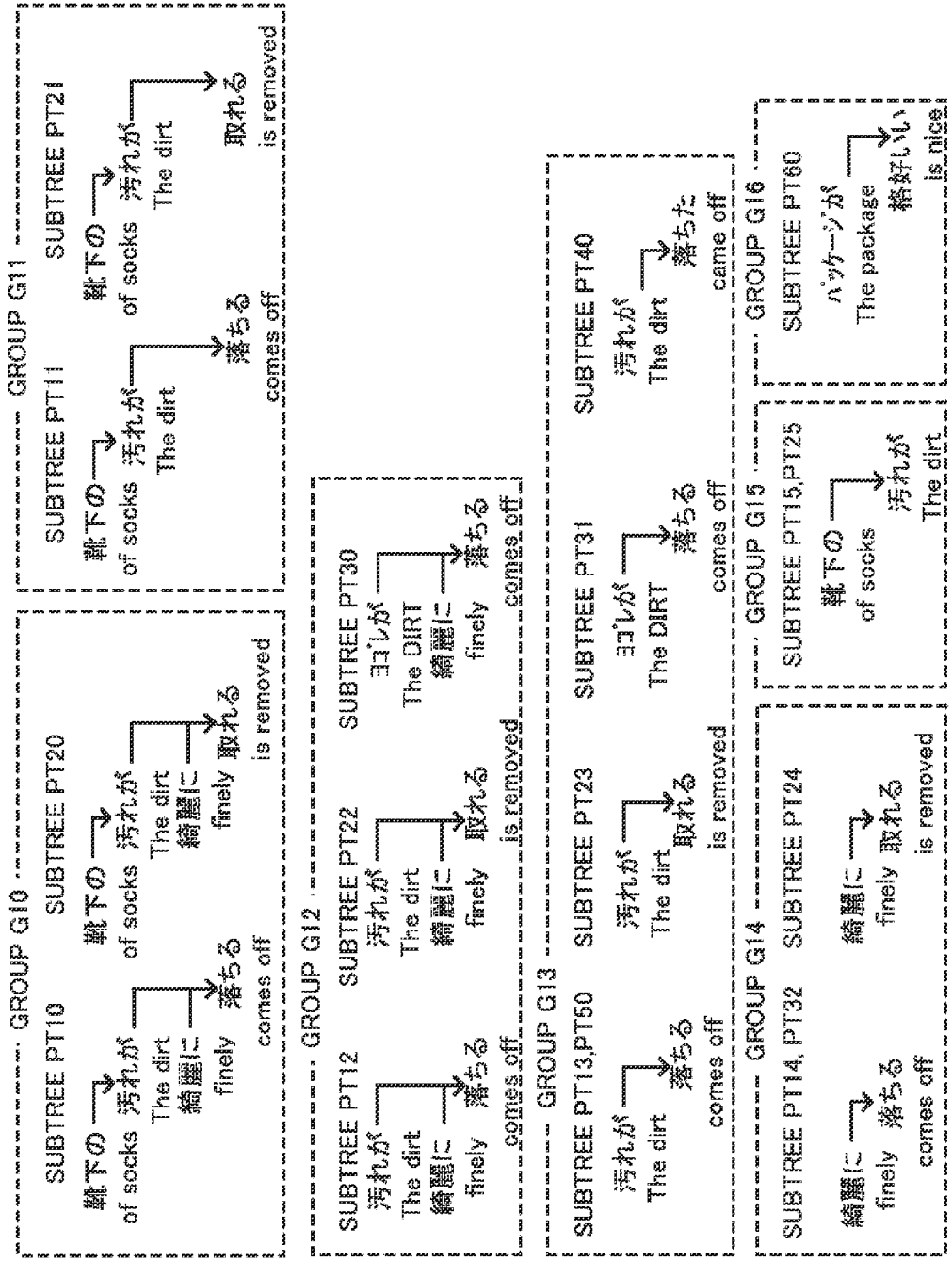
FIG. 23 is drawing showing one example of categorization results for a group after the subtree categorization process was executed in the first preferred embodiment.

When execution of the subtree categorization process ends in step S07*a* of FIG. 5, the subtrees PT10 and PT20 have been categorized to the group G10, the subtrees PT11 and PT21 have been categorized to the group G11 and the subtrees PT12, PT22 and PT30 have been categorized to the group G12, as shown in FIG. 23. In addition, the subtrees PT13, PT23, PT31, PT40 and PT50 have been categorized to the group G13, the subtrees PT14, PT24 and PT32 have been categorized to the group G14, the subtrees PT15 and PT25 have been categorized to the group G15 and the subtree PT60 has been categorized to the group G16.

Figure 24:
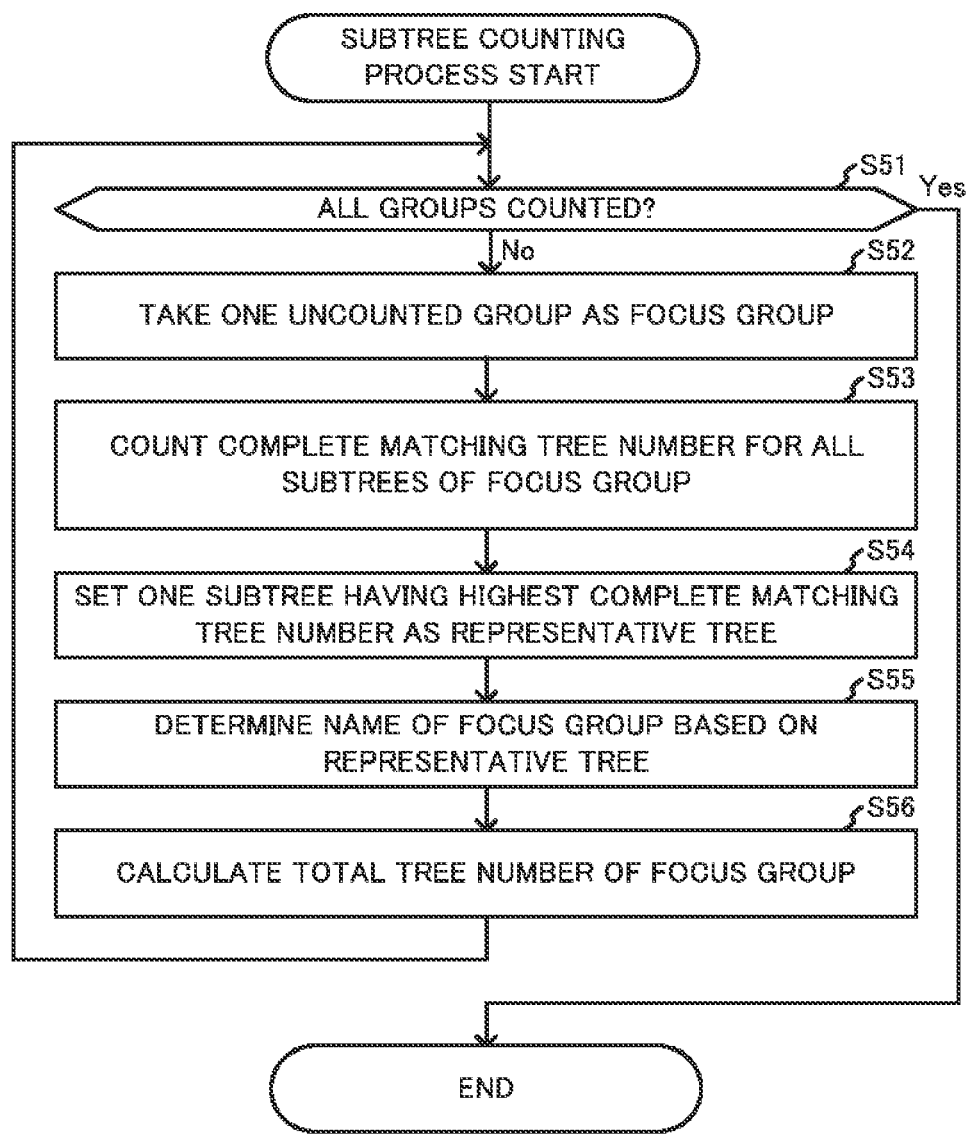
FIG. 24 is a flowchart showing one example of a subtree counting process executed by the counting device.

After step S07*a* of FIG. 5 has been executed, the counting part 126 executes a subtree counting process shown in FIG. 24, counting the number of subtrees categorized to these groups (step S07*b*).

When the counting process starts, the counting part 126 references the group table shown in FIG. 15. Next, the counting part 126 determines whether or not the number of subtrees has been counted for all groups identified by group IDs stored in the group table (step S51). At this time, none of the groups G10 to G16 has been counted, so the counting part 126 determines that counting has not been done for all groups (step S51; No).

Next, the counting part 126 focuses on one uncounted group and takes the focused-on group as a focus group (step S52). At this time, the explanation assumes that the counting part 126 focusses on the group G10, out of the uncounted groups G10 to G16.

Next, the counting part 126 counts the number of subtrees completely matching each other (that is to say, the number of completely matching trees) for all subtrees categorized in the focus group (step S53). In the group table shown in FIG. 15, "PT10, PT20" not including the symbol "=" representing a complete match is stored, associated with the group ID "G10" of the group G10. Consequently, the counting part 126 determines that the subtree PT10 shown in FIG. 18B and the subtree PT20 shown in FIG. 19B are categorized in the group G10, and that no subtrees completely matching each other are categorized.

Next, the counting part 126 takes one subtree having the largest number of matching trees as a representative tree (step S54). Here, the number of completely matching trees of the subtrees PT10 and PT20 are respectively "0", so the explanation assumes that the counting part 126 takes as a representative tree the subtree PT10 having the lower subtree ID.

Next, the counting part 126 determines a name for the focus group based on the representative tree (step S55). Here, the explanation assumes that the counting part 126 sets as the name of the focus group G10 the sentence "The dirt of socks comes off finely" represented by the representative tree PT10.

Next, the counting part 126 counts the total number (hereafter referred to as the total tree number) of subtrees categorized into the focus group (step S56). Here, the explanation assumes that the counting part 126 has calculated a total tree number of "2" for the "PT10, PT20" associated with the group ID "G10".

Following this, the saving part 121 saves the group ID "G10", the subtree ID "PT10" of the representative tree, the group name "The dirt of socks comes off finely", the group name matching tree count "1" of the group and the total tree number "2" in the group table shown in FIG. 15, associated with each other.

Next, the explanation assumes that the counting part 126 takes the groups G11 and G12 in order as the focus group. The counting part 126 repeatedly executes the processes from step S51 to step S56.

Through this, the group ID "G11", the subtree ID "PT11" of the representative tree, the group name "The dirt of socks comes off", the group name complete match tree number "1" and the total tree number "2" are stored in the group table associated with each other.

In addition, the group ID "G11", the subtree ID "PT12" of the representative tree, the group name "The dirt comes off finely", the group name complete match tree number "1" and the total tree number "3" are stored in the group table associated with each other.

Next, the explanation assumes that the counting part 126 takes the group G13 as the focus group. The counting part 126 executes the processes of step S51 and step S52.

Here, in the group table shown in FIG. 15, "PT13=PT50, PT23, PT31, PT40", including "PT13" and "PT50" linked by the symbol "=" representing a complete match, are associated with the group ID "G13" of the group G13. Consequently, the counting part 126 determines that the subtree PT13 of FIG. 18E, the subtree PT23 of FIG. 19E, the subtree PT31 of FIG. 20C, the subtree PT40 of FIG. 21D and the subtree PT50 of FIG. 21E are categorized in the group G13. In addition, the counting part 126 determines that the subtree PT13 and the subtree PT50 completely match each other.

Consequently, the counting part 126 counts that the complete match tree numbers of the subtrees PT13 and PT50 categorized in the focus group G13 are respectively "1", and the complete match tree numbers of the subtrees PT23, PT31 and PT40 are respectively "0" (step S53).

Next, because the complete match tree numbers of the subtrees PT13 and PT50 are respectively "1", the counting part 126 takes the subtree PT13 with the smaller subtree ID as the representative tree (step S54).

Next, the counting part 126 executes step S55 and step S56. Through this, the group ID "G13", the subtree ID "PT13" of the representative tree, the group name "the dirt comes off", the group name complete match tree number "2" and the total tree number "5" are stored in the group table, associated with each other.

Next, the explanation assumes that the counting part 126 takes groups G14 to G16 in order as the focus group. The counting part 126 repeatedly executes the processes of step S51 to step S56.

Through this, the group ID "G14", the subtree ID "PT14" of the representative tree, the group name "comes off finely", the group name complete match tree number "2" and the total tree number "3" are stored in the group table, associated with each other. In addition, the group ID "G15", the subtree ID "PT15" of the representative tree, the group name "the dirt of socks", the group name complete match tree number "1" and the total tree number "2" are stored in the group table, associated with each other.

Furthermore, the group ID "G16", the subtree ID "PT60" of the representative tree, the group name "The package is nice", the group name complete match tree number "1" and the total tree number "1" are stored in the group table, associated with each other.

Following this, the counting part 126 determines that all of the groups G10 to G16 have been counted (step S51; Yes), and ends execution of the subtree counting process.

Figure 25:
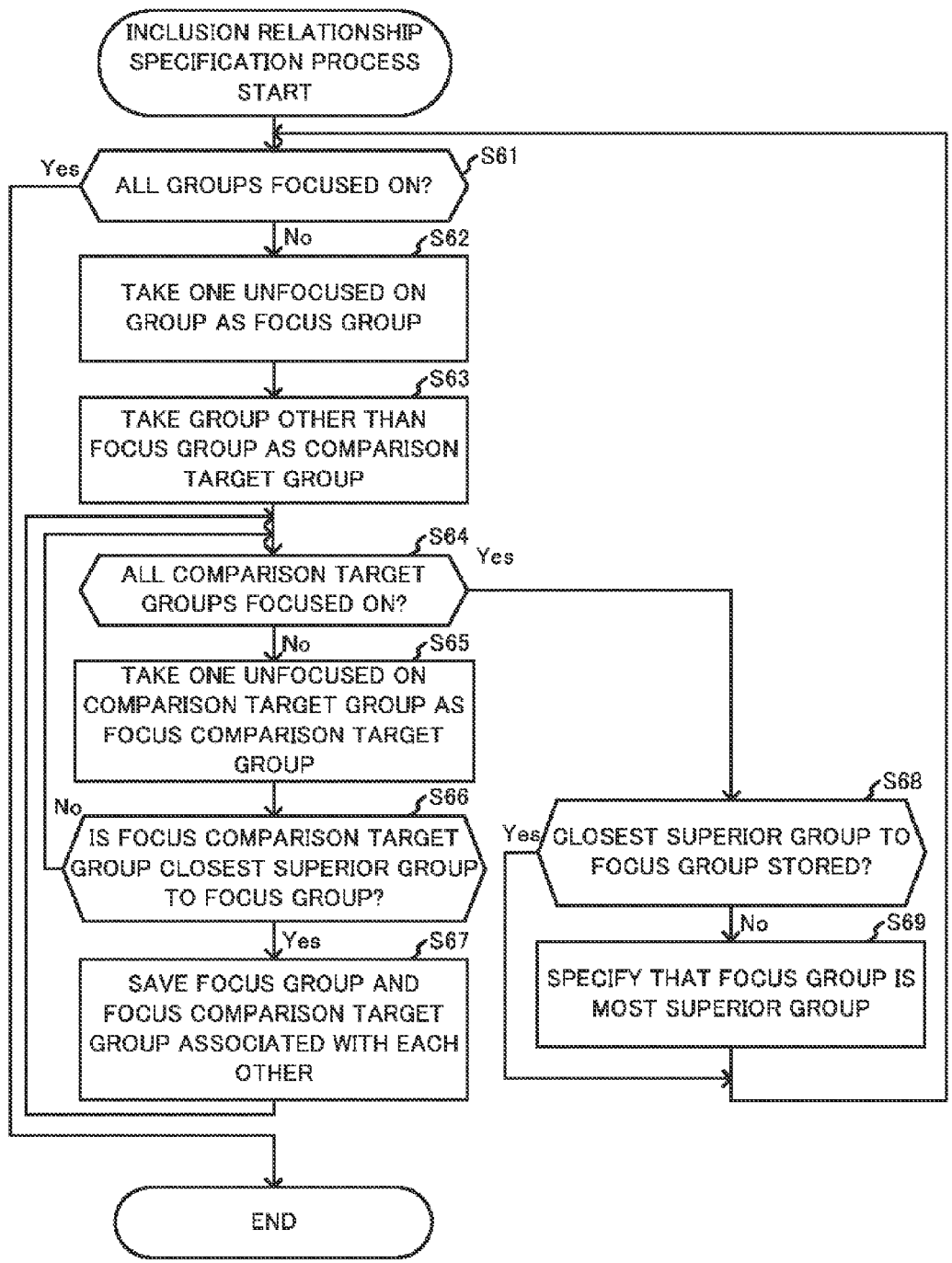
FIG. 25 is a flowchart showing one example of an inclusion relationship specification process executed by the counting device.

When execution of step S07b of FIG. 5 ends, the categorizing part 125 executes an inclusion relationship specification process such as is shown in FIG. 25, for specifying the inclusion relationship of these groups (step S08).

When the inclusion relationship specification process begins, the categorizing part 125 acquires the group IDs "G10" to "G16" from the group table shown in FIG. 15.

Next, the categorizing part 125 determines whether or not all groups respectively identified by the multiple group IDs acquired from the group table have been focused on (step S61). At this time, the categorizing part 125 has just begun the inclusion relationship specification process so none of the groups has been focused on. Consequently, the categorizing part 125 determines that all groups have not been focused on (step S61; No).

Next, the categorizing part 125 takes one of the group IDs "G10" to "G16" of groups that have not yet been focused on as the focus group (step S62). Here, the explanation will assume that the group G10 with the lowest group ID number is taken as the focus group.

Next, the categorizing part 125 takes a group G11 to G16 different from the focus group G10 as a group for comparison with the focus group (hereafter referred to as the comparison target group) (step S63).

Following this, the categorizing part 125 determines whether or not all of the comparison target groups G11 to G16 have been focused on (step S64). At this time, the categorizing part 125 has not focused on any of the comparison target groups G11 to G16, so the determination is that all comparison target groups G11 to G16 have not been focused on (step S64: No).

Next, the categorizing part 125 focuses on one of the unfocussed-on comparison target groups G11 to G16, and takes the focused-on group as the focus comparison target group (step S65). Here, the explanation assumes that the categorizing part 125 takes the comparison target group G11 having the lowest group ID as the focus comparison target group.

Next, the match determination part 124 determines whether or not the focus comparison target group G11 is the closest superior group to the focus group G10 (step S66). Specifically, the match determination part 124 acquires the total branch number "3" associated with the focus group G10 from the group table shown in FIG. 15. This total branch number is the total branch number of the representative tree PT10 categorized in the focus group, and is the total number of modifier-head relationships represented by the representative tree PT10. In addition, the match determination part 124 acquires the total branch number "2" associated with the focus comparison target group G11. This branch number is the total branch number of the representative tree PT11 categorized in the focus comparison target group G11. Following this, the match determination part 124 determines that the total branch number "2" of the focus comparison target group G11 is one smaller than the total branch number "3" of the focus group G10, and determines that there is a possibility that the focus comparison target group G11 is the closest superior group to the focus group G10. As stated above, this is because the branch number of subtrees belonging to the closest superior group to the focus group is one less than the branch number of the subtrees belonging to the focus group.

Next, the match determination part 124 determines whether or not the representative tree PT11 of the focus comparison target group G11 is a partial syntax tree of the representative tree PT10 of the focus group G10. If the representative tree PT11 is a partial syntax tree of the representative tree PT10, the concept represented by the representative tree PT11 contains the concept represented by the representative tree PT10. Consequently, when the match determination part 124 determines that the representative tree PT11 is a partial syntax tree of the representative tree PT10, it is determined that the focus comparison target group G11 is the closest superior group to the focus group G10.

Specifically, the match determination part 124 acquires the height "2" associated with the group ID "G10" of the focus group G10 (hereafter called the focus group ID), from the group table. The height is the height of the representative tree PT10 representing the focus comparison target group G10 shown in FIG. 18B. In addition, the match determination part 124 acquires the height "2" associated with the target group ID "G11" of the focus comparison target group G11, from the group table. This height is the height of the representative tree PT11 representing the focus group G11 shown in FIG. 18C.

Because the representative tree PT11 of the focus comparison target group G11 and representative tree PT10 of the focus group G10 have the same heights, the match determination part 124 determines that the concept represented by the representative tree PT11 is a superior concept to the concept represented by the representative tree PT10. This is because the height of the subtree representing a superior concept is the same as or lower than the height of a subtree representing an inferior concept.

Furthermore, the match determination part 124 determines that the root node "comes off" of the representative tree PT11 and the root node "comes off" of the representative tree PT10 match. In addition, the match determination part 124 determines that the phrase "the dirt" modifying the root node of the representative tree PT11 and the phrase "the dirt" modifying the root node of the representative tree PT10 match. Furthermore, the match determination part 124 determines that "of socks" modifying the phrase "the dirt" of the representative tree PT11 and "of socks" modifying the phrase "the dirt" of the representative tree PT10 match. That is to say, the match determination part 124 determines that the representative tree PT10 of the focus group G10 possess all of the head phrases and modifier phrases possessed by the representative tree PT11 of the focus comparison target group G11.

Consequently, the match determination part 124 determines that the representative tree PT11 categorized in the focus comparison target group G11 is a partial syntax tree of the representative tree PT10 of the focus group G10. Accordingly, the match determination part 124 determines that the focus comparison target group G11 is the closest superior group to the focus group G10 (step S66 of FIG. 25; Yes).

Even when the representative tree PT10 possesses head phrases and modifier phrases that completely match or effectively match all of the head phrases and modifier phrases possessed by the representative tree PT11, the match determination part 124 determines that the representative tree PT11 is a partial syntax tree of the representative tree PT10.

Next, the categorizing part 125 sets the group ID "G11" of the focus comparison target group G11 as the closest superior group ID for the focus group G10. Following this, the saving part 121 saves the group ID "G10" of the focus group G10 and the closest superior group ID "G11" associated with each other in the inclusion relationship table shown in FIG. 16 (step S67 of FIG. 25).

Following this, the categorizing part 125 returns to step S64 and determines that all of the comparison target groups G11 to G16 have not been focused on (step S64; No). This is because the categorizing part 125 has only focused on the comparison target group G11 out of the comparison target groups G11 to G16.

Next, the categorizing part 125 takes the comparison target group G12 as the focus comparison target group, from among the unfocussed-on comparison target groups G12 to G16 (step S65).

Next, the match determination part 124 determines that the focus comparison target group G12 is the closest superior group to the focus group G10 (step S66). Specifically, the match determination part 124 acquires the total branch number "3" associated with the focus group G10 and the total branch number "2" associated with the focus comparison target group G12, from the group table shown in FIG. 15. Following this, the match determination part 124 determines that the total branch number "2" of the focus comparison target group G12 is one less than the total branch number "3" of the focus group G10, and determines that there is a possibility that the focus comparison target group G12 is a closest superior group of the focus group G10.

Next, the match determination part 124 acquires the height "2" associated with the group ID "G10" of the focus group G10 and the height "1" associated with the focus group ID "G12" of the focus comparison target group G12, from the group table. The height of the representative tree PT12 of the focus comparison target group G12 is lower than the height of the representative tree PT10 of the focus group G10, so the match determination part 124 determines that there is a possibility that the concept represented by the representative tree PT12 is a superior concept to the concept represented by the representative tree PT10.

Furthermore, the match determination part 124 determines that the root node "comes off" of the representative tree PT12 and the root node "comes off" of the representative tree PT10 match. In addition, the match determination part 124 determines that the phrase "the dirt" modifying the root node of the representative tree PT12 and the phrase "the dirt" modifying the root node of the representative tree PT10 match. Furthermore, the match determination part 124 determines that the phrase "finely" modifying the root node of the representative tree PT12 and the phrase "finely" modifying the root node of the representative tree PT10 match. That is to say, the match determination part 124 determines that the representative tree PT10 of the focus group G10 possess all of the head phrases and modifier phrases possessed by the representative tree PT12 of the focus comparison target group G12.

Consequently, the match determination part 124 determines that the representative tree PT12 categorized in the focus comparison target group G12 is a partial syntax tree of the representative tree PT10 of the focus group G10, and that the focus comparison target group G12 is a closet superior group of the focus group G10 (step S66; Yes).

Next, the categorizing part 125 sets the group ID "G12" of the focus comparison target group G12 as the closest superior group ID of the focus group G10. Consequently, the saving part 121 saves the group ID "G10" of the focus group G10 and the closest superior group ID "G11" in the inclusion relationship table shown in FIG. 16, associated with each other (step S67). Following this, the categorizing part 125 repeats the above-described processes from step S64.

Following this, the categorizing part 125 executes the processes of steps S64 and S65 with the comparison target group G13 as the focus comparison target group.

Following this, the match determination part 124 determines that the focus comparison target group G13 is not the closest superior group of the focus group G10 (step S66; No). This is because in the group table, the total branch number "1" associated with the focus comparison target group G13 is at least two smaller than the total branch number "3" associated with the focus group G10.

Following this, the categorizing part 125 repeatedly executes the processes from steps S64 to S66 with the comparison target groups G14 to G16 respectively as the focus comparison target group. Through this, the categorizing part 125 determines that the focus comparison target groups G14 to G16 are not closest superior groups of the focus group G10.

Following this, the categorizing part 125 determines that all of the comparison target groups G11 to G16 have been focused on (step S64; Yes).

Next, the categorizing part 125 determines that the group ID "G10" of the focus group G10 and the group IDs "G11" and "G12" of the closest superior groups are stored associated with each other in the inclusion relationship table shown in FIG. 16 (step S68; Yes). Consequently, the categorizing part 125 determines that the focus group G10 is not the most superior group.

Next, the categorizing part 125 repeats the above-described processes from step S61 with the groups G11 and G12 in order as the focus group. Through this, the saving part 121 saves the group ID "G11" of the group G11 and the group IDs "G13" and "G15" of the closest superior groups of the group G11 associated with each other in the inclusion relationship table shown in FIG. 16. In addition, the saving part 121 saves the group ID "G12" of the group G12 and the group IDs "G13" and "G14" of the closest superior groups to the group G12 associated with each other in the inclusion relationship table.

Next, the categorizing part 125 repeats the processes from step S61 to step S66 with the group G13 as the focus group and the groups G10 to G12 and G14 to G16 as focus comparison target groups. Following this, the categorizing part 125 determines that all of the comparison target groups G10 to G12 and G14 to G16 have been focused on (step S64; Yes).

Next, the categorizing part 125 determines that the group ID "G13" of the focus group G13 and the group ID of the closest superior group are not stored associated with each other in the inclusion relationship table shown in FIG. 16 (step S68; No). Consequently, the categorizing part 125 determines that the focus group G13 is not the most superior group (step S69).

Following this, the saving part 121 saves the group ID of the group G13 and a symbol "-" representing that the closest superior group of the group G13 does not exist, in the inclusion relationship table, associated with each other.

Following this, the categorizing part 125 repeats the processes from steps S61 to S66, and steps S68 and S69 with the groups G14 to G16 as focus groups. Through this, the saving part saves the group IDs of the groups G14 to G16 and the symbol "-" representing that closest superior groups of these groups do not exist, in the inclusion relationship table, associated with each other.

Following this, the categorizing part 125 determines that all of the groups G10 to G16 have been focused on (step S61; Yes), and ends execution of the inclusion relationship specification process.

Figure 26:
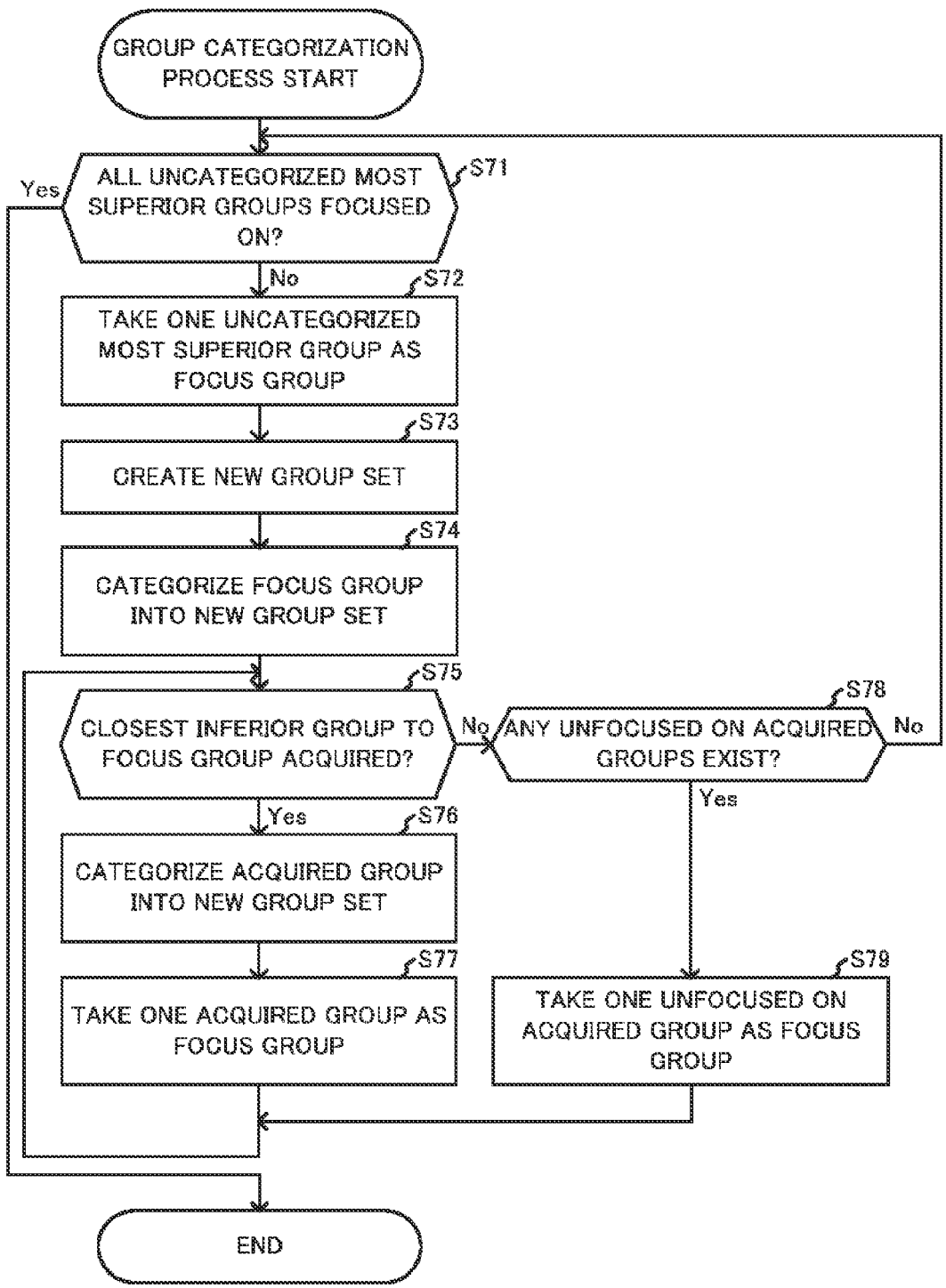
FIG. 26 is a flowchart showing one example of a group categorization process executed by the counting device.

After step S08 of FIG. 5 has been executed, a group categorization process such as is shown in FIG. 26 is executed, categorizing groups based on the concepts represented by subtrees categorized into groups and specifying the tier structure between categorized groups (step S09 of FIG. 5).

When the group categorization process begins, the categorizing part 125 refers to the inclusion relationship table shown in FIG. 16. Next, the categorizing part 125 acquires the group IDs "G13" to "G16" associated with the symbol "-" stored in the inclusion relationship table. The group IDs associated with the symbol "-" are the most superior groups for which a closest superior group does not exist.

Next, the categorizing part 125 determines whether or not all of the most superior groups not yet categorized into group sets (hereafter referred to as uncategorized most superior groups) G13 to G16 have been focused on (step S71). At this time, the group categorization process has just begun, so none of the uncategorized most superior groups G13 to G16 have been focused on, and consequently the categorizing part 125 determines that all of the uncategorized most superior groups G13 to G16 have not been focused on (step S71; No).

Next, the categorizing part 125 focusses on one of the uncategorized most superior groups G13 to G16 and sets this as the focus group (step S72). Here, the explanation assumes the categorizing part 125 is focusing on the group G13.

Next, the categorizing part 125 creates a new group set SG1 into which are categorized groups into which are categorized subtrees representing the concept of "the dirt comes off" represented by the representative tree PT13 of the focus group G13 (step S73). Following this, the categorizing part 125 categorizes the focus group G13 into the created group set SG1 (step S74). Next, the saving part 121 saves the group set ID "SG1" of the group set SG1 and the group ID "G13" of the focus group G13, associated with each other, in the tier structure table shown in FIG. 17.

Next, the categorizing part 125 determines that the closest inferior group of the focus group G13 has been searched and the groups G11 and the group G12 have been acquired, from the inclusion relationship table shown in FIG. 16 (step S75; Yes). Specifically, the categorizing part 125 acquires the group IDs "G11" and "G12" associated with the closest superior group ID "G13" and sets the groups G11 and G12 identified by the acquired group IDs "G11" and "G12" as the closest inferior groups (hereafter called acquired groups).

Next, the categorizing part 125 categorizes the acquired groups G11 and G12 into the new group set SG1 created in step S73 (step S76).

Next, the categorizing part 125 focusses on one of the acquired groups G11 and G12 and sets this as the focus group (step S77). Here, the explanation assumes that the categorizing part 125 sets the acquired group G11 as the focus group.

Following this, the categorizing part 125 executes steps S75 to S77, acquires the closest inferior group G10 of the focus group G11, categorizes the group G10 into the group set SG1 and sets the group G10 as the focus group.

Following this, the categorizing part 125 executes step S75, and determines that the closest inferior group of the focus group G10 cannot be acquired from the inclusion relationship table shown in FIG. 16 (step S75; No).

Next, the categorizing part 125 determines that there is an unfocussed-on group G12 out of the acquired groups G11, G12 and G10 acquired in step S76 (step S78; Yes).

Next, the categorizing part 125 repeats the processes from steps S75 to S77 with the unfocused-on group G12 as the focus group (step S79). Through this, the categorizing part acquires the closest inferior group G10 of the focus group G12. In addition, the saving part 121 saves the group set ID "SG1", the group ID "G10" and the closest superior group ID "G12", associated with each other, in the tier structure table shown in FIG. 17.

Following this, the categorizing part 125 determines in step S75 that the closest inferior group of the focus group G10 could not be acquired from the inclusion relationship table shown in FIG. 16 (step S75; No).

Next, the categorizing part 125 determines that there are no unfocussed-on groups out of the acquired groups G11, G12 and G10 acquired in step S76 (step S78; No).

Following this, the categorizing part 125 repeatedly executes steps S71 to S77. Through this, the categorizing part creates new group set SG2 to SG4. In addition, the categorizing part 125 categorizes the group G14, the closest inferior group G12 of the group G14, and the closest inferior group G10 of the group G12 in the group set SG2. Furthermore, the categorizing part 125 categorizes the group G15, the closest inferior group G11 of the group G15, and the closer inferior group G10 of the group G11 in the group set SG3. Furthermore, the categorizing part 125 categorizes the group G16 into the group set SG4.

Following this, the categorizing part 125 determines that there are no acquired groups that have not been focused on (step S78; No). Next, the categorizing part 125 determines that all of the most superior groups G13 to G16 have been focused on (step S71; Yes), and ends execution of the group categorization process.

Figure 27:
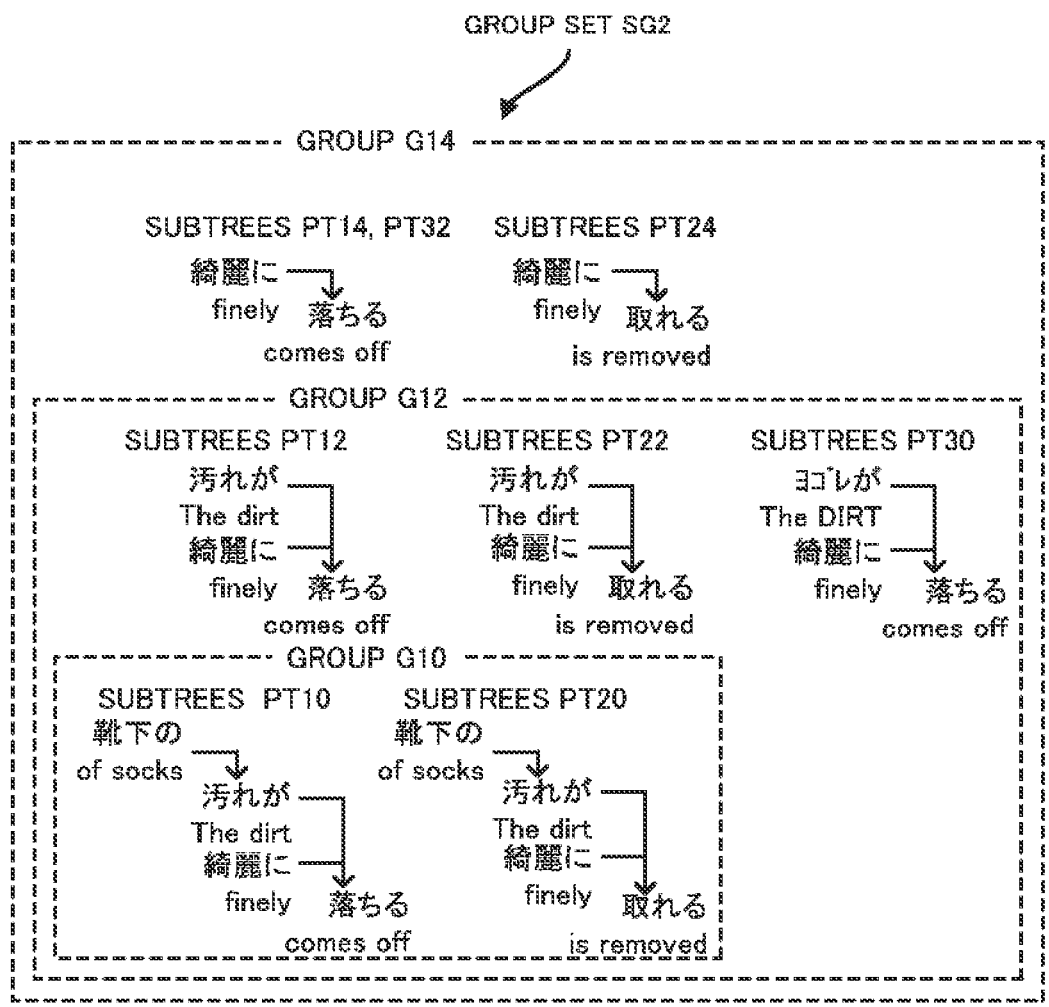
FIG. 27 is a drawing showing one example of categorization results of a group after the group categorization process is executed in the first preferred embodiment.

When execution of the group categorization process ends in step S09 of FIG. 5, the groups G10, G12 and G14 whose subtrees represent the mutually common concept of "comes off finely" are categorized into the group set SG2. These groups G10, G12 and G14 form a tier structure like that shown in FIG. 27. In this tier structure, the group G12 superior to the group G10 includes the group G10, and the group G14 superior to the group G12 includes the group G12.

The groups G10, G11, G12 and G13 categorized into the group set SG1, the groups G10, G11 and G15 categorized into the group set SG3 and the group G16 categorized into the group set SG4 respectively form different tier structures, although such are omitted from the drawings.

After the subtree counting process in step S09 of FIG. 5 is executed, the output part 127 shown in FIG. 6 executes a counting results screen generation process generating the counting results screen shown in FIG. 3 (step S10).

When the counting results screen generation process begins, the output part 127 generates the counting results screen shown in FIG. 3. Next, the output part 127 creates trees T1 to T4 representing the groups respectively categorized into group set SG1 to SG4 stored in the tier structure table shown in FIG. 17, and displays such in the counting results screen.

Specifically, first the output part 127 acquires the group ID (that is to say the group ID of the most superior group) "G13" associated with the symbol "-" representing that there is no closest superior group, from the tier structure table. Next, the output part 127 acquires the group name "the dirt comes off" associated with the group ID "G13", the group name matching tree count "2" and the total tree number "5", from the group table shown in FIG. 15. Following this, the output part 127 generates a root RT1 representing a character string encompassing the group name matching tree count in parentheses and a test string encompassing the total tree number in brackets, at the end of the character string representing the acquired group name, and sets this as the root of the tree T1.

Next, the output part 127 acquires the group IDs (that is to say, the group IDs of the closest inferior groups of the group G13) "G11" and "G12" associated with the closest superior group ID "G13", from the tier structure table. Next, the output part 127 acquires the group name "the dirt of socks comes off" associated with the group ID "G11", the group name matching tree count "1" and the total tree number "2", from the group table. In addition, the output part 127 acquires the group name "the dirt comes off finely" associated with the group ID "G12", the group name matching tree count "1" and the total tree number "3" from the group table. Following this, the output part 127 generates leaves LF12 and LF13 representing the character string in which the group name matching tree counts of the respective groups are enclosed in parentheses, and the character string in which the total tree number is enclosed in brackets, at the end of the character string representing the acquired group name with respect to the two groups, respectively. Next, the output part 127 respectively generates branches linking the leaves LF12 and LF13, and the root RT1.

Following this, the output part 127 acquires the group ID associated with the closest superior group ID "G11" (that is to say the group ID of the closest inferior group of the group G11) "G10", from the tier structure table. Next, the output part 127 acquires the group name "the dirt of socks comes off finely" associated with the group ID "G10", the group name matching tree count "1", and the total tree number "2", from the group table. Following this, the output part 127 generates a leaf LF14 representing a character string in which the group name matching tree count of the respective groups is enclosed in parentheses and a character string in which the total tree number is enclosed in brackets, at the end of a character string representing the acquired group names. Following this, the output part 127 generates a branch linking the leaf LF14 and the leaf LF12.

Similarly, the output part 127 acquires the group ID associated with the closest superior group ID "G12" (that is to say, the group ID of the closest inferior group of the group G12) "G10", from the tier structure table. Following this, the output part 127 generates a leaf LF15 representing a character string in which the group name matching tree count of the group G10 is enclosed in parentheses and a character string in which the total tree number is enclosed in brackets, at the end of a character string representing the group name of the group G10. Following this, the output part 127 generates a branch linking the leaf LF15 and the leaf LF13.

In this manner, the output part 127 generates a tree T1 having a root RT1 and leaves LF11 to LF15. In addition, the output part 127 similarly generates a tree T2 having a root RT2 and leaves LF22 and LF23, a tree T3 having a root RT3 and leaves LF31 and LF32, and a tree T4 having a root RT4. Following this, the output part 127 displays the trees T1 to T4 on the counting results screen.

Following this, the output part 127 outputs the generated counting result screen to the LAN card 106 (step S11 of FIG. 5). Following this, the LAN card 106 sends the counting results screen to the terminal device 20, following which the output part 127 ends execution of the counting process.

The terminal device 20, upon receiving the counting results screen, displays the counting results screen received on a display device.

In this preferred embodiment, the input part 120 was explained as inputting responses to questionnaires received from the terminal device 20 or 21, but the responses are not limited to Japanese sentences.

With this kind of composition, the counting device 100 executes the process of step S26b in FIG. 21 for all combinations of any one of the subtrees PT10 to PT15 and any one of the subtrees PT20 to PT25. When it is determined in step S26b that the expression representing any one of the subtrees PT10 to PT15 and the expression representing any one of the subtrees PT20 to PT25 match, the counting device 100 categorizes these subtrees into the same group. Following this, the counting device 100 outputs expressions respectively representing the number of subtrees categorized into a group or one or multiple subtrees categorized into that group. Consequently, the counting device 100 can count the extent to which expressions represented by subtrees in multiple input sentences are used.

In addition, with this composition, the counting device 100 determines whether or not multiple subtrees represent the same expressions based on phrases respectively assigned to the height of the subtree, the branch number and leaves appended to the root and branches. Here, if the height of the subtree and the number of branches differ, the modifier-head relationships of phrases respectively assigned to the leaves appended to the root and branches differ. Consequently, it is possible for the counting device 100 to determine whether or not multiple subtrees represent the same expression of the modifier-head relationship.

Furthermore, with this composition, the counting device 100 determines whether or not to represent content in which an expression represented by the subtree PT10 and an expression represented by the subtree PT20 match, based on whether or not the modifier phrases of the subtree PT10 and the modifier phrases of the subtree PT20 match and whether or not the head phrases of the subtree PT10 and the head phrases of the subtree PT20 match, in step S26b of FIG. 21. Here, even if the heights of the subtrees, the branch numbers and the phrases are the same, if any of the modifier phrases and head phrases differ from each other, the modifier-head relationship of the phrases differs. Consequently, it is possible for the counting device 100 to determine with good accuracy whether or not multiple subtrees represent the same expression of the modifier-head relationship.

Furthermore, with this composition, the counting device 100 determines the inclusion relationship between the group G10 and the group G11 in step S38 of FIG. 23, based on the height, branch number and number of phrases of subtrees belonging to the group G10 and the height, branch number and number of phrases of subtrees belonging to the group G11. Consequently, the counting device 100 can output expressions respectively represented by the subtrees PT10 and PT20 categorized in group G11 and expressions respectively represented by subtrees PT11 and PT21 categorized in group G12 in an array based on the inclusion relationship between the group G11 and the group G12. Hence, a user can easily understand whether or not expressions respectively represented by the subtrees PT10 and PT20 represent the same content, and contents included in expressions representing the same content respectively represented by the subtrees PT11 and PT21 are represented.

With this composition, the counting device 100 determines, in the group categorization process shown in FIG. 23, that the expression represented by the subtree PT11 is a superior expression to the expression represented by the subtree PT10 when all of the modifier phrases possessed by the subtree PT11 categorized in the group G11 match any of the modifier phrases possessed by the subtree PT10 categorized in the group G10. In addition, when the counting device 100 determines that the expression represented by the subtree PT11 categorized in the group G11 is a superior expression to the expression represented by the subtree PT10 categorized in the group G10, the group G11 is set as a superior group to the group G10. Here, the larger the number of modifier phrases modifying the same head phrase, the more precisely these modifier phrases are limited compared to the content represented by the head phrases. Consequently, the counting device 100 can precisely determine the inclusion relationship of expressions respectively represented by multiple subtrees categorized into multiple groups.

With this composition, in the group categorization process shown in FIG. 23, when the counting device 100 determines that the modifier phrase "the dirt" and the head phrase "comes off" match between the subtree PT11 categorized in the group G11 and the subtree PT13 categorized in the group G13, the counting device 100 determines that the expression represented by the subtree PT13 not possessing "of socks" modifying the modifier phrase "the dirt" is a superior expression to the expression represented by the subtree PT11. Here, the subtree to which the modifier phrase has been added represents an expression more limited by the modifier phrase than the expression represented by the subtree prior to adding. Consequently, the counting device 100 can accurately determine the inclusion relationship of expressions respectively represented by multiple subtrees.

In addition, with this composition, in the subtree categorization process shown in FIG. 21, even when there is notational variance between the phrase of the categorization target tree and the phrase of the focus already-categorized tree, and even when the phrase of the categorization target tree is a synonym or rewording of the phrase of the focus already-categorized tree, it is possible to determine whether or not the expression represented by the categorization target tree and the expression represented by the focus already-categorized tree are expressions representing the same content.

In this preferred embodiment, the explanation used an as example a case in which the counting device 100 comprises the input part 120, saving part 121, syntax analyzing part 122, subtree generating part 123, match determination part 124, categorizing part 125, counting part 126, output part 127 and information memory 129 shown in FIG. 6. However, it is not necessary for the counting device 100 to necessarily comprise all of the input part 120, saving part 121, syntax analyzing part 122, subtree generating part 123, match determination part 124, categorizing part 125, counting part 126, output part 127 and information memory 129, and it would be fine to not provide any of these components.

Second Preferred Embodiment

In the first preferred embodiment, as explained with reference to FIG. 9B, the match determination part 124 of FIG. 6 determines that the sentence "The dirt of socks comes off finely" represented by the first subtree and the sentence "The dirt of socks is removed finely" represented by the second subtree represent content that effectively matches. This is because the root node of the first subtree and the root node of the second subtree are different but are synonyms of each other, and the phrases "the dirt" and "finely" modifying the root node and the phrase "of socks" modifying the phrase "the dirt" match in the first subtree and the second subtree.

In the second preferred embodiment, when the first subtree has a head phrase such as a root node and a prescribed number of modifier phrases modifying the head phrase, and the second subtree has a head phrase such as the root node and a prescribed number of modifier phrases modifying the head phrase, the match determination part 124 determines that the head phrases match each other upon determining that the prescribed number of modifier phrases respectively match each other, and determines that the first subtree and the second subtree match. The ideal prescribed number can be established by one skilled in the art through experimentation.

Figure 28:
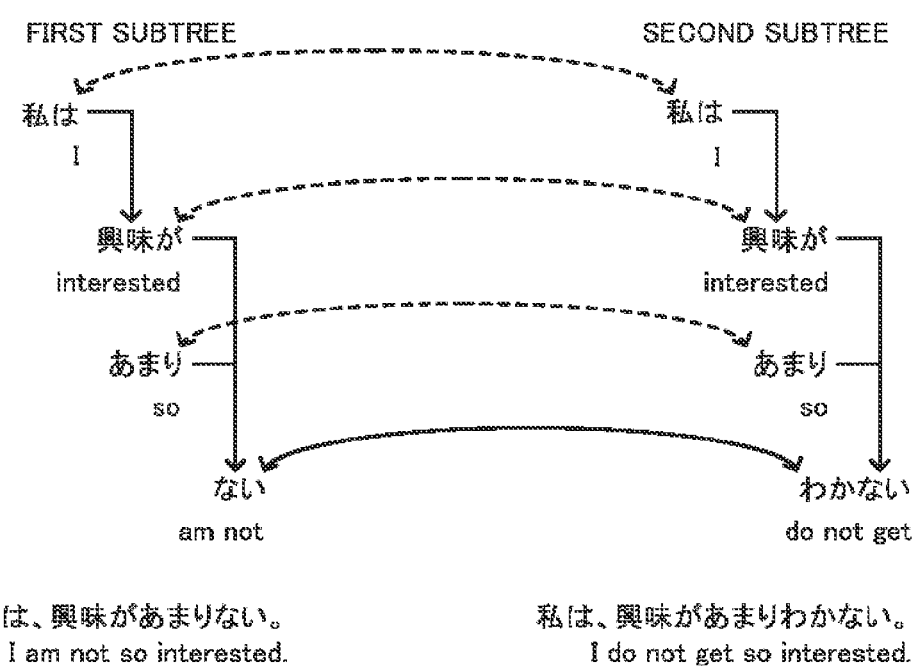
FIG. 28 is a drawing showing one example of a first subtree and a second subtree determined to match in a second preferred embodiment.

The explanation will use as an example the first subtree and second subtree shown in FIG. 28.

The match determination part 124 determines that the sentence "I am not so interested" represented by the first subtree shown in FIG. 28 and the sentence "I do not get so interested" represented by the second subtree represent content that effectively matches.

That is because although the root node of the first subtree and the root node of the second subtree are different and are not synonyms of each other, when the phrases "so" and "interested" modifying the root node and the phrase "I" modifying the phrase "interested" match in the first subtree and the second subtree, the match determination part 124 determines that the first subtree and the second subtree effectively match.

Users frequently respond with standardized sentences to questions such as surveys and/or the like. These standardized sentences often include multiple sentences representing the same content in which the modifier (that is to say, the modifier phrase) is standardized but the modified term (that is to say, the head phrase) is not standardized. Consequently, with this kind of composition, when a prescribed number of modifier phrases match each other even if the head phrases do not match each other, the match determination part 124 deems the head phrases to match each other. Consequently, when multiple sentences respectively represented by multiple subtrees are standardized sentences, it is possible to determine with better accuracy than before whether or not multiple subtrees represent mutually matching content.

Third Preferred Embodiment

Figure 29:
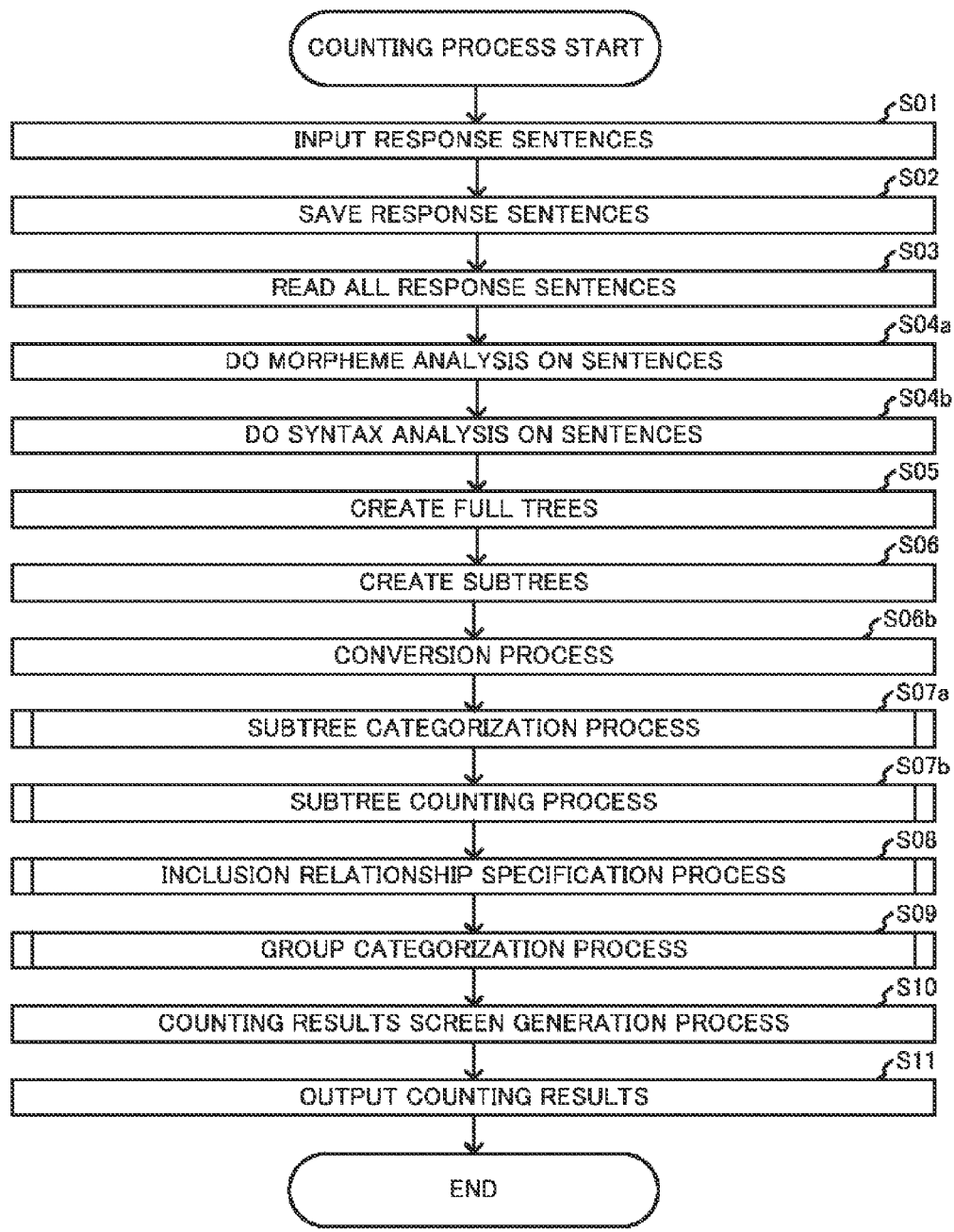
FIG. 29 is a flowchart showing one example of a counting process executed by a counting device according to a third preferred embodiment.

In the first preferred embodiment, the CPU 101 shown in FIG. 4 executes the counting process shown in FIG. 5, but in the third preferred embodiment, the CPU 101 executes the counting process shown in FIG. 29. Through this, the CPU 101 functions as a phrase conversion part 128 shown in FIG. 30 in addition to the other functional components shown in FIG. 6.

When a subtree generated by the subtree generating part 123 satisfies all of the below pre-conversion conditions (1) to (3), the phrase conversion part 128 converts the subtree so as to satisfy the below post-conversion conditions (1) and (2).

Pre-conversion condition (1): The end of the modifier phrase of the subtree is the particle "to" or "to ha".

Pre-conversion condition (2): The modifier phrase includes a verb, an adjective or a quasi-adjective (that is to say, an inflectable word) and represents an affirmative expression, and there is no comma between the modifier phrase and the head phrase modified by the modifier phrase.

Pre-conversion condition (3): The head phrase represents a negative expression.

Post-conversion condition (1): The head phrase represents an affirmative expression.

Post-conversion condition (2): The modifier phrase represents a negative expression.

Figure 31A:
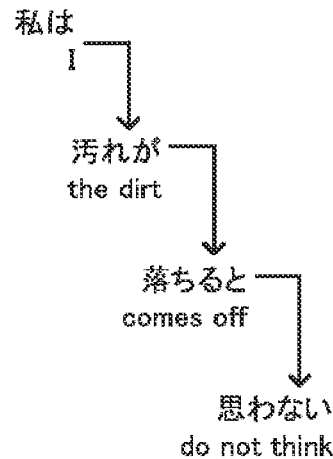
FIG. 31A is a drawing showing a first example of a subtree to be converted by the counting device according to the third preferred embodiment.

The explanation will take as an example a case in which the generated subtree is the subtree shown in FIG. 31A.

Figure 31B:
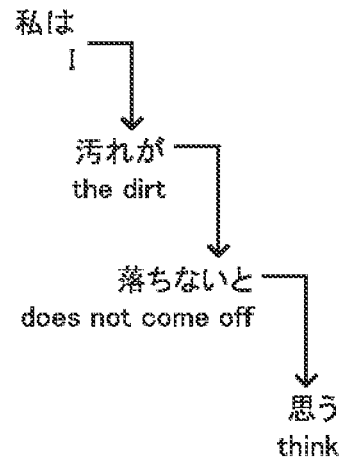
FIG. 31B is a drawing showing one example of a subtree converted by the counting device according to the third preferred embodiment.

The subtree shown in FIG. 31A represents the sentence "I do not think the dirt comes off." The phrase conversion part 128 converts this subtree into a subtree representing "I think the dirt does not come off" shown in FIG. 31B.

This is because the end of the modifier phrase "comes off" modifying the phrase "do not think" in this subtree is the particle "to", so the phrase conversion part 128 determines that the subtree of FIG. 31A satisfies the pre-conversion condition (1).

In addition, the modifier phrase "comes off" of this subtree includes a verb (that is to say, an inflectable word). In addition, the modifier phrase "comes off" is an affirmative expression. Furthermore, there are no commas between the modifier phrase "comes off" and the head phrase "do not think" being modified by the modifier phrase "comes off". Consequently, the phrase conversion part 128 determines that the subtree of FIG. 31A satisfies the pre-conversion condition (2).

Furthermore, the head phrase "do not think" of this subtree includes a negative expression. Consequently, the phrase conversion part 128 determines that the subtree of FIG. 31A satisfies the pre-conversion condition (3).

Because of this, the phrase conversion part 128 converts the head phrase "do not think" into "think" representing an affirmative expression and converts the modifier phrase "comes off" to "does not come off" representing a negative expression. Through this, the phrase conversion part 128 converts the subtree to the subtree shown in FIG. 31B satisfying the post-conversion conditions (1) and (2).

The pre-conversion subtree shown in FIG. 31A represents the sentence "I do not think the dirt comes off". What is negated by the negative expression of the phrase "do not think" in this sentence is the phrase "comes off" modifying the phrase "do not think". Consequently, even if the phrase "do not think" is converted to the affirmative expression "think" and the modifier phrase "comes off" is converted to the negative expression "does not come off", the meaning does not change. In other words, the sentences "I do not think the dirt comes off" represented by the pre-conversion subtree shown in FIG. 31A and the sentence "I think the dirt does not come off" represented by the post-conversion subtree shown in FIG. 31B represent the same meaning. Consequently, the content of the sentence represented by the subtrees does not change from before to after the phrase conversion part 128 converts the subtree.

Figure 31C:
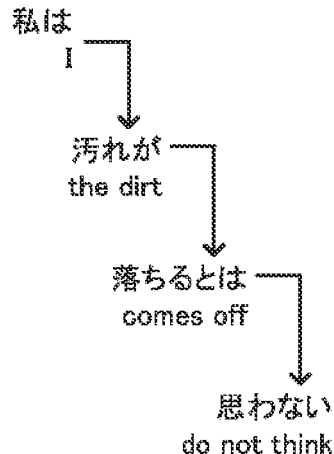
FIG. 31C is a drawing showing a second example of a subtree to be converted by the counting device according to the third preferred embodiment.

Similarly, when the subtree generated by the subtree generating part 123 is a subtree such as is shown in FIG. 31C, the phrase conversion part 128 converts the subtree to the subtree shown in FIG. 31B.

The subtree shown in FIG. 31C represents the sentence "I do not think the dirt comes off". Because the end of the phrase "comes off" in this subtree is the particle "to ha", the phrase conversion part 128 determines that this subtree satisfies the pre-conversion condition (1).

Figure 32A:
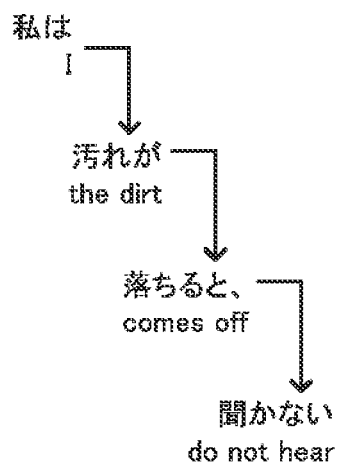
FIG. 32A is a drawing showing one example of a subtree not converted by the counting device according to the third preferred embodiment.
Figure 32B:
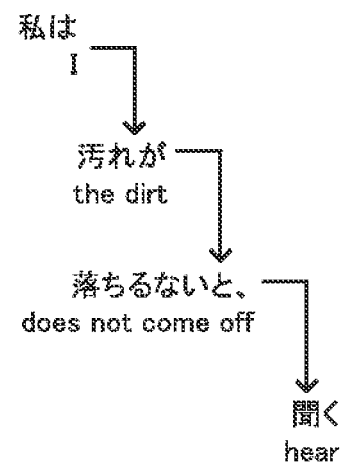
FIG. 32B is a drawing showing one example of a subtree representing meaning different from the subtree shown in FIG. 32A.

In contrast, when the subtree generated by the subtree generating part 123 is a subtree such as is shown in FIG. 32A, the phrase conversion part 128 does not convert the subtree to the subtree shown in FIG. 32B.

The subtree shown in FIG. 32A represents the sentence "I do not hear the dirt comes off". Because there is a comma between the modifier phrase "comes off" and the head phrase "do not hear" in this subtree, the phrase conversion part 128 determines that this subtree does not satisfy the pre-conversion condition (2).

The pre-conversion subtree shown in FIG. 32A represents the sentence "I do not hear the dirt comes off", and what is negated by the negative expression of the phrase "do not hear" in this sentence is not the phrase "comes off" modifying the phrase "do not hear". That is why a comma is used between the phrase "do not hear" and the phrase "comes off".

Consequently, when the phrase "do not hear" is converted to the affirmative expression "hear" and the modifier phrase "comes off" is converted to the negative expression "does not come off", the meaning changes. In other words, the sentence "I do not hear the dirt comes off" represented by the subtree shown in FIG. 32A is not a sentence that alludes to whether or not "I hear the dirt does not come off" of the sentence represented by the subtree shown in FIG. 32B. Hence, the phrase conversion part 128 does not convert subtrees not satisfying the pre-conversion condition (2).

Figure 30:
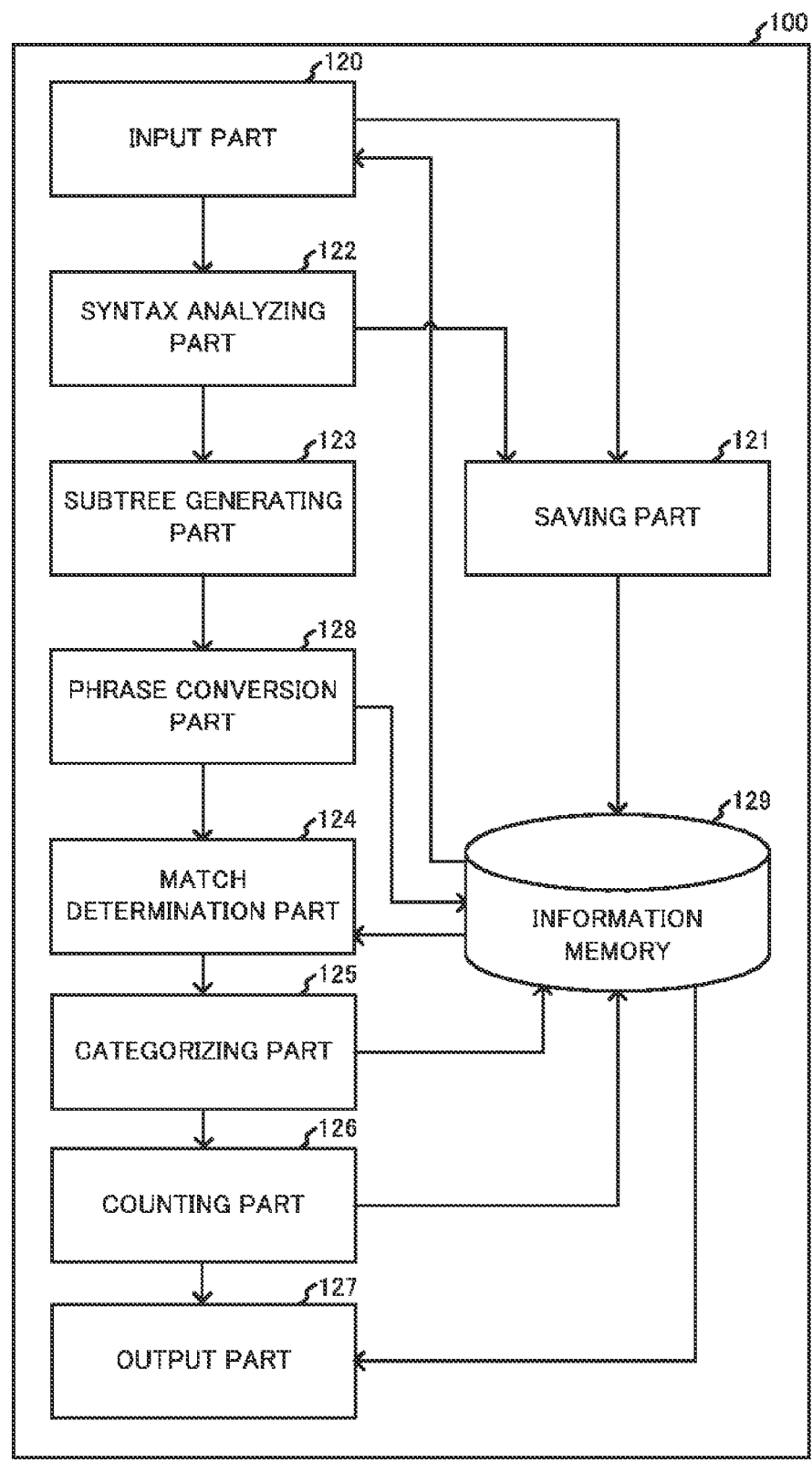
FIG. 30 is a function block diagram showing one example of functions possessed by the counting device according to the third preferred embodiment.

Next, the actions of the CPU 101 accomplished by the various functional components such as the phrase conversion part 128 and/or the like shown in FIG. 30 are explained.

The CPU 101 starts execution of the counting process shown in FIG. 29 and executes the processes from steps S01 to S06 upon receiving a survey response sentence from the terminal device 20 or 21.

Next, the phrase conversion part 128 executes a conversion process for converting subtrees satisfying all of the above-described pre-conversion conditions (1) to (3) into subtrees satisfying the above-described post-conversion conditions (1) and (2), from among multiple subtrees respectively generated in step S05 and step S06b.

Following this, the categorizing part executes the subtree categorization process shown in FIG. 21 using the converted subtrees (step S07a).

Here, the explanation takes as an example a case in which for step S26b of FIG. 22 the focus already-categorized tree is the subtree shown in FIG. 31A, and the categorization target tree is converted to the subtree shown in FIG. 31B from the subtree shown in FIG. 31A by the phrase conversion part 128.

The sentence represented by the pre-conversion categorization target tree is "I do not think the dirt comes off" as shown in FIG. 31A. In contrast, the sentence represented by the focus already-categorized tree is "I think the dirt does not come off" as shown in FIG. 31B. Consequently, the pre-conversion categorization target tree and the focus already-categorized tree are not determined to be subtrees that match each other despite representing sentences with the same meaning. That is because the modifier phrase "comes off" of the pre-conversion categorization target tree and the modifier phrase "does not come off" of the focus already-categorized tree differ, and the head phrase "do not think" of the pre-conversion categorization target tree and the head phrase "think" of the focus already-categorized tree differ.

However, the sentence represented by the post-conversion categorization target tree is the same as the sentence represented by the focus already-categorized tree and is the sentence "I think the dirt does not come off" shown in FIG. 31B. Consequently, the post-conversion categorization target tree and the focus already-categorized tree are determined to be subtrees that match each other. Hence, with this composition, the determination accuracy when determining whether or not multiple subtrees represent the same content is improved from before.

In this preferred embodiment, the explanation assumes the counting device 100 comprises the input part 120, saving part 121, syntax analyzing part 122, subtree generating part 123, match determination part 124, categorizing part 125, counting part 126, output part 127, phrase conversion part 128 and information memory 129 shown in FIG. 30. However, the counting device 100 need not comprise all of these components, and it would be fine to not provide any of these components.

Fourth Preferred Embodiment

In the third preferred embodiment, the explanation assumes that the phrase conversion part 128 converted a subtree so as to satisfy the above-described post-conversion conditions (1) and (2) when a subtree generated by the subtree generating part 123 satisfies all of the above-described pre-conversion conditions (1) to (3).

In other words, the explanation assumes that the phrase conversion part 128 for example converts the subtree representing the sentence "I do not think the dirt comes off" such as is shown in FIG. 31A into the subtree representing the sentence "I think the dirt does not come off" such as is shown in FIG. 31B.

In this preferred embodiment, the phrase conversion part 128 converts a subtree so as to satisfy the below-described post-conversion conditions (3) and (4) when a subtree generated by the subtree generating part 123 satisfies all of the above-described pre-conversion conditions (1) and (2) and the below-described pre-conversion condition (4).

Pre-conversion condition (4): The modifier phrase represents a negative expression.

Post-conversion condition (3): The head phrase represents a negative expression.

Post-conversion condition (4): The modifier phrase represents an affirmative expression.

In other words, the phrase conversion part 128 convers the subtree representing the sentence "I think the dirt does not come off" such as is shown in FIG. 31B into the subtree representing the sentence "I do not think the dirt comes off" such as is shown in FIG. 31A.

Fifth Preferred Embodiment

In the first preferred embodiment, the explanation was for execution of the counting process executed by the counting device 100 when a response sentence comprising two or more phrases is input. In contrast, in this preferred embodiment, the explanation is for execution of the counting process executed by the counting device 100 when a response sentence comprising two or more phrases and a response sentence comprising just one phrase are input. Below, the explanation primarily is for differences from the first preferred embodiment.

In this preferred embodiment, the explanation assumes that response sentences to the survey question "What are the good points about this product XXX?" are input into the counting device 100.

The counting device 100 upon starting execution of the counting process shown in FIG. 5 executes step S01 and step S02. Through this, the counting device 100 has response sentences to the survey inputted and saves the input response sentences in the input sentence table shown in FIG. 11.

Here, the explanation assumes that when the process in step S02 has ended, eight sentences such as those shown in FIG. 33 are stored in the input sentence table.

The eight sentences shown in FIG. 33 are the sentence "The price is very low" identified by the sentence ID "ST11", the sentence "The cost is low" identified by the sentence ID "ST12", the sentence "The price is attractive" identified by the sentence ID "ST13", the sentence "The price" identified by the sentence ID "ST14", the sentence "The cost" identified by the sentence ID "ST15", the sentence "low" identified by the sentence ID "ST16", and the sentence "Detergency" identified by the sentence IDs "ST17" and "ST18".

The sentences respectively identified by the sentences IDs "ST11" to "ST13" are sentences composed of two or more phrases. In contrast, the sentences respectively identified by the sentence IDs "ST14" to "ST18" are sentences composed of only one phrase.

Following step S02 in FIG. 5, the input part 120 reads all of the response sentences stored in the input sentence table (step S03), accomplishes morpheme analysis on the eight sentences read (step S04a) and accomplishes syntax analysis on the morpheme string obtained through morpheme analysis (step S04b).

In this manner, the syntax analyzing part 122 generates full trees FT11 to FT13 representing the sentences respectively shown in FIGS. 34A, 34E and 34G from the sentences comprising two or more phrases respectively identified by the sentence IDs "ST11" to "ST13". In contrast, the syntax analyzing part 122 generates full trees FT14 to FT18 comprised of a single node representing sentences such as are respectively shown in FIGS. 35A, 35D, 35G, 36A and 36D from the sentences composed of only one phrase respectively identified by the sentence IDs "ST14" to "ST18" (step S05 of FIG. 5).

Next, the subtree generating part 123 generates subtrees PT110 to PT112 respectively shown in FIGS. 34B to 34D from the full tree FT11 shown in FIG. 34A, the same as in the first preferred embodiment. Similarly, the subtree generating part 123 generates a subtree PT120 shown in FIG. 34F from the full tree FT12 shown in FIG. 34E, and generates a subtree PT130 shown in FIG. 34H from the full tree FT13 shown in FIG. 34G.

In addition, in this preferred embodiment, the subtree generating part 123 generates a subtree (hereafter referred to as the head-added subtree) PT140 such as is shown in FIG. 35B. to which the root "*" representing all phrases being modified by the one node possessed by the full tree FT14 is added, from the full tree FT14 shown in FIG. 35A. In addition, the subtree generating part 123 generates a subtree (hereafter referred to as the modifier-added subtree) PT141 such as is shown in FIG. 35C to which the word "*" representing all phrases modifying the one node possessed by the full tree FT14 is added, from the full tree FT14.

Similarly, the subtree generating part 123 generates a head-added subtree PT150 shown in FIG. 35E and a modifier-added subtree PT151 shown in FIG. 35F, from the full tree FT15 shown in FIG. 35D. Similarly, the subtree generating part 123 generates a head-added subtree PT160 shown in FIG. 35H and a modifier-added subtree PT161 shown in FIG. 35I, from the full tree FT16 shown in FIG. 35G. Furthermore, similarly the subtree generating part 123 generates a head-added subtree PT170 shown in FIG. 36B and a modifier-added subtree PT171 shown in FIG. 36C, from the full tree FT17 shown in FIG. 36A. And furthermore, similarly the subtree generating part 123 generates a head-added subtree PT180 shown in FIG. 36E and a modifier-added subtree PT181 shown in FIG. 36F, from the full tree FT18 shown in FIG. 36D (step S06 of FIG. 5).

Following this, the subtree categorization process shown in FIG. 22 is executed for the subtrees (that is to say, the subtrees generated from sentences comprising two or more phrases), excluding subtrees having the root "*" or the leaf "*" (that is to say, subtrees generated from sentences comprising one phrase) (step S07a).

Figure 37:
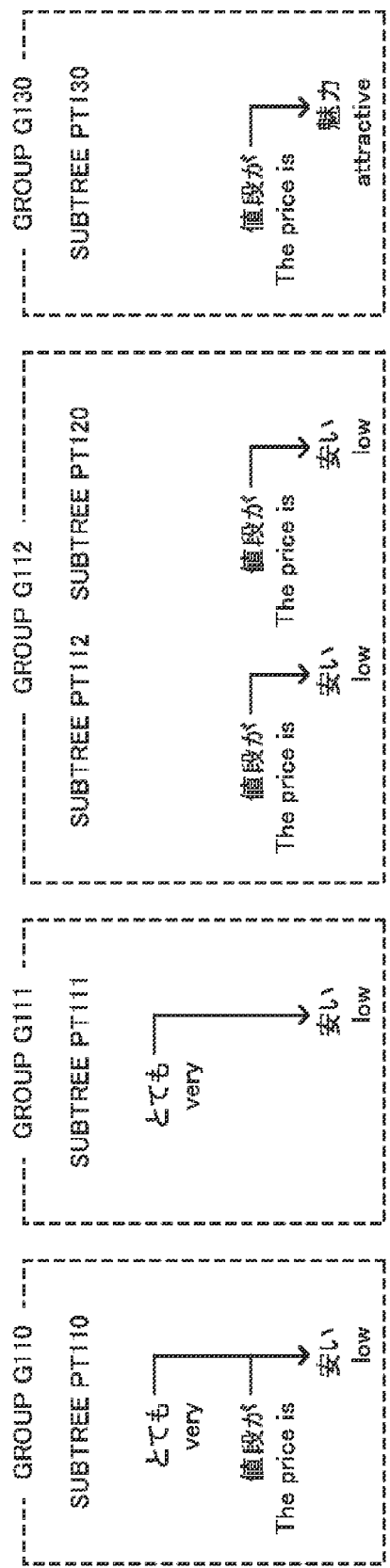
FIG. 37 is a drawing showing one example of categorization results for groups after the subtree categorization process is executed, in the fifth preferred embodiment.

When execution of the subtree categorization process ends, the subtree PT110 is categorized into a group G110 and the subtree PT111 is categorized into a group G111, as shown in FIG. 37. In addition, subtrees PT112 and PT120 are categorized into a group G112. That is because "cost" and "price", which is a synonym of "cost", are stored associated with each other in the synonym table shown in FIG. 14B. Furthermore, the subtree PT130 is categorized in a group G130.

After step S07a of FIG. 5 is executed, the counting part 126 executes the subtree counting process shown in FIG. 24 (step S07b). In the first preferred embodiment, the explanation assumes that the counting part 126 took as the group name a sentence represented by a representative tree of the group, for each group. In contrast, in this preferred embodiment, when there is one subtree categorized to a group, the counting part 126 takes the sentence represented by that subtree as the group name, and when multiple subtrees are categorized to a group, the counting part 126 takes a sentence in which the sentences respectively represented by the multiple subtrees are linked by commas as the group name.

When execution of step S07b of FIG. 5 ends, the categorizing part 125 specifies the inclusion relationship of group G110, group G111, group G112 and group G130 shown in FIG. 37 by executing the inclusion relationship specification process shown in FIG. 25 (step S08).

Figure 38:
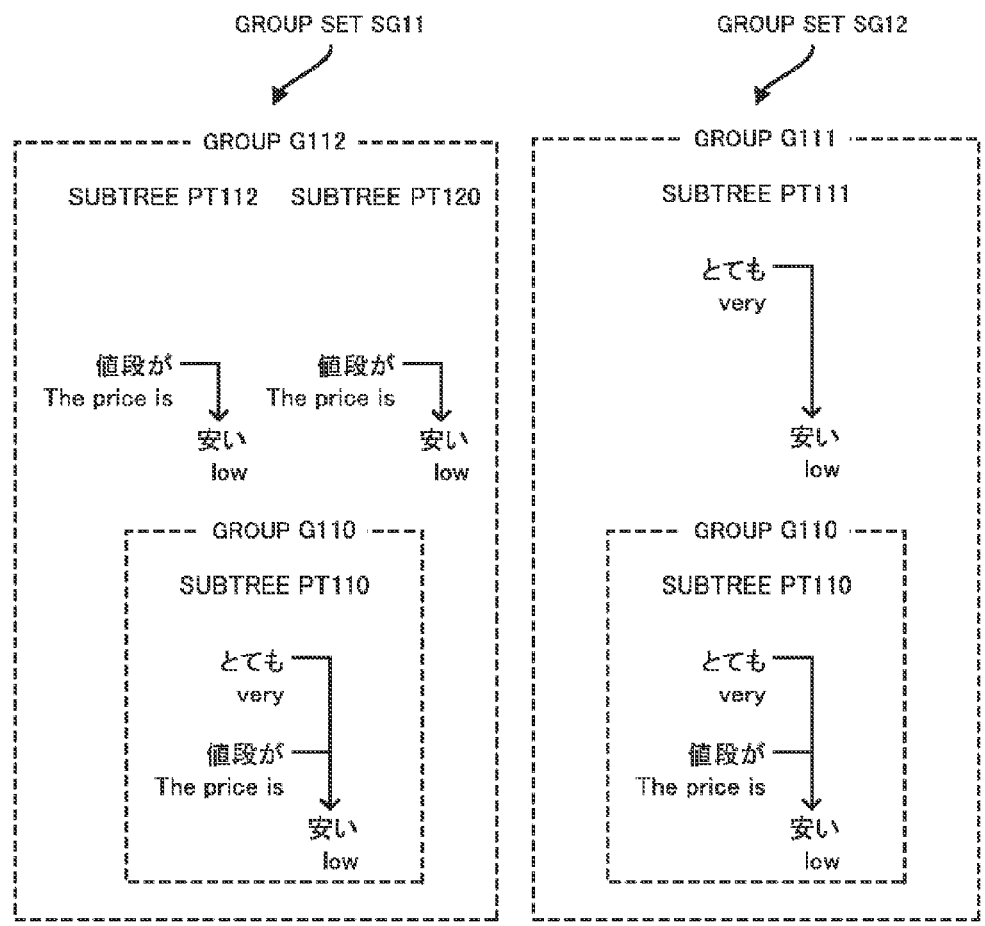
FIG. 38 is a drawing showing one example of categorization results for groups after the group categorization process is executed in the fifth preferred embodiment.

Next, the categorizing part 125 executes the group categorization process shown in FIG. 26 (step S09). Through this, the categorizing part categorizes the group G110 and the group G112 into a group set SG11, to which groups representing the concept of "the price is low" or "the cost is low" are categorized, as shown in FIG. 38. In addition, the categorizing part 125 categorizes the group G110 and the group G111 into a group set SG12, to which groups representing the concept of "very low" are categorized. Furthermore, the categorizing part categorizes the group G130 into a group set SG13, to which groups representing the concept of "the price is attractive" are categorized.

Furthermore, the categorizing part 125 specifies a tier structure in which the group G110 categorized into the group set SG11 is included by the group G112 that is a superior group to the group G110. Similarly, the categorizing part 125 specifies a tier structure in which the group G110 categorized into the group set SG12 is included by the group G111 that is a superior group to the group G110.

Next, the output part 127 executes the counting results screen generation process generating the counting results screen shown in FIG. 3 (step S10 of FIG. 5).

Figure 39:
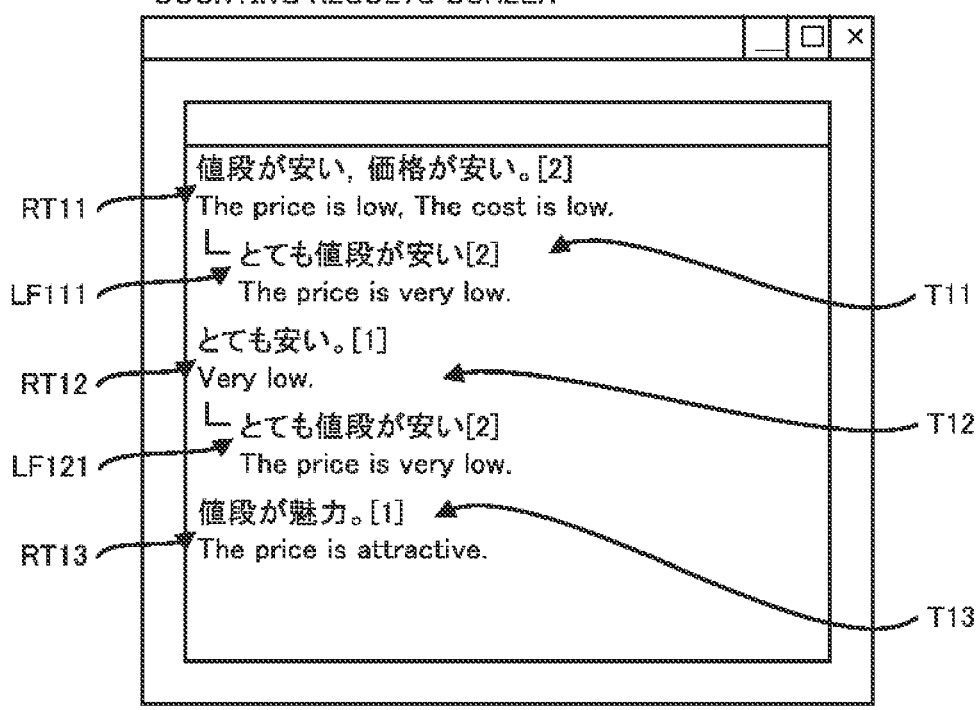
FIG. 39 is a drawing showing one example of a categorization results screen in the fifth preferred embodiment.

When the counting results screen generation process beings, the output part 127 generates trees T11 to T13 shown in FIG. 39 by following the specified tier structure. The tree T11 possesses a root RT11 representing the group name of the group G112 and the total tree number "2" of the group G112, and a leaf LF111 representing the group name of the group G110 and the total tree number "2" of the group G110. In addition, the tree T12 possesses a root RT12 representing the group name of the group G111 and the total tree number "1" of the group G111, and a leaf LF121 representing the group name of the group G110 and the total tree number "2" of the group G112. Furthermore, a tree T13 possesses a root RT13 representing the group name of the group G130 and the total tree number "1" of the group G130.

Next, the output part 127 specifies the head-added subtree PT140 shown in FIG. 35B and the modifier-added subtree PT141 shown in FIG. 35C as the head-added subtree and the modifier-added subtree generated from the same sentence comprising only one phrase.

Next, the output part 127 specifies the group G112 into which are categorized the subtree PT112, composed of two phrases and representing the sentence "the price is low" and effectively matching the head-added subtree PT140 representing "the cost *", and PT120 composed of two phrases and representing the sentence "the cost is low" and completely matching the head-added subtree PT140. In addition, the output part 127 specifies the group G130 into which is categorized the subtree PT130 composed of two phrase and representing "The price is attractive" and effectively matching the head-added subtree PT140 representing "the cost *". Next, the output part 127 determines that a group into which subtrees completely or effectively matching the modifier-added subtree PT141 does not exist.

Following this, the output part 127 determines that the total tree number "2" of the subtrees categorized into the group G112 is larger than the total tree number '1' of the subtrees categorized into the group G130. The sentence "the cost" is conjectured to be a sentence provided as a response by a responder as a sentence representing the same content as content represented by the sentence "The cost is low" represented by the subtree PT112 categorized into the group G112. Consequently, the output part 127 determines that the meaning represented by the sentence "cost" composed of one phrase used in generating the added subtree PT140 is complementarily explained by the head phrase "low".

Figure 40:
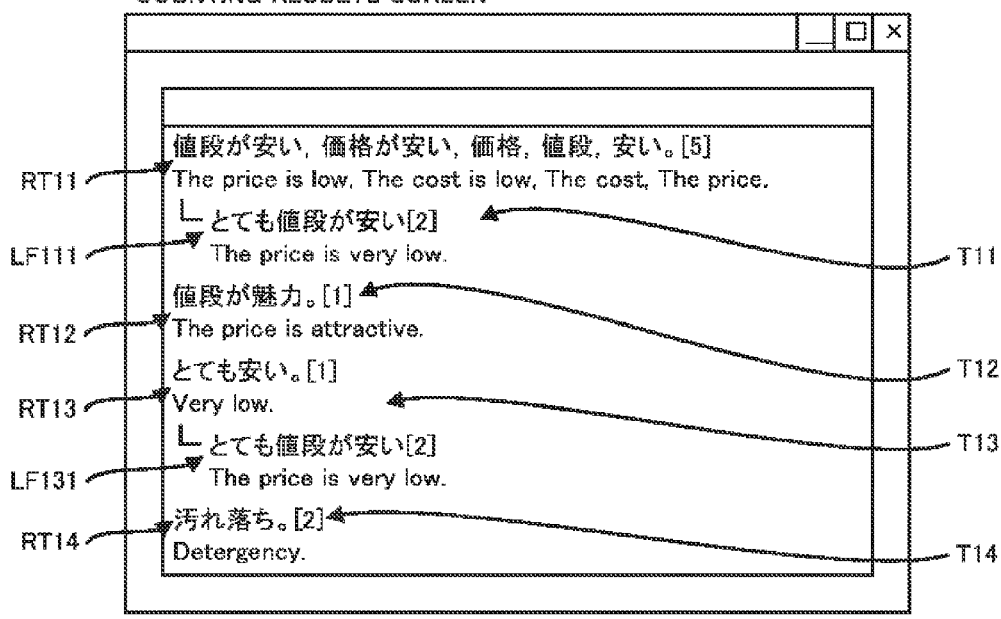
FIG. 40 is a drawing showing another example of the counting results screen in the fifth preferred embodiment.

Next, the output part 127 changes the root RT11 representing "The price is low, the cost is low" possessed by the tree T11 shown in FIG. 40 into a root representing "The price is low, the cost is low, the cost" and increases by "1" to "3" the total tree number represented by the root RT11.

Next, the output part 127 specifies the head-added subtree PT150 shown in FIG. 35E and the modifier-added subtree PT151 shown in FIG. 35F as the head-added subtree and the modifier-added subtree generated from the same sentence comprising only one phrase. Next, the output part 127 determines that the meaning represented by the sentence "the price" comprising one phrase used in generating the added subtree PT150 is complementarily explained by the head phrase "low". Next, the output part 127 changes the root RT11 representing "the price is low, the cost is low, the cost" possessed by the tree T11 into a root representing "the price is low, the cost is low, the cost, the price" and adds the cost "1" to the total tree number represented by the root RT11 to make "4".

Next, the output part 127 specifies the head-added subtree PT160 shown in FIG. 35H and the modifier-added subtree PT161 shown in FIG. 35I as the head-added subtree and the modifier-added subtree generated from the same sentence comprising only one phrase.

Next, the output part 127 determines that a group to which are categorized subtrees completely matching or effectively matching the head-added subtree PT160 representing "low *" does not exist. In addition, the output part specifies the group G111 to which is categorized the subtree PT111 comprising two sentences and representing the sentence "very low" and completely matching the head-added subtree PT160 representing "* low". Furthermore, the output part 127 specifies the group G112 to which are categorized PT120 representing the sentence "The cost is low" and the subtree PT112 representing the sentence "The price is low", each comprising two sentences and completely matching the head-added subtree PT160 representing "* low".

Following this, the output part 127 determines that the total tree number "2" of the subtrees categorized to the group G112 is larger than the total tree number "1" of the subtrees categorized to the group G111. Consequently, the output part 127 determines that the meaning represented by the sentence "low" comprising only one sentence used in generating the head-added subtree PT160 is complementarily explained by the head phrase "the price" or "the cost".

Next, the output part 127 changes the root RT11 representing "The price is low, the cost is low, the cost, the price" possessed by the tree T11 shown in FIG. 40 to a root representing "The price is low, the cost is low, the cost, the price, low" and adds "1" to the total tree number represented by the root RT11, making this "5".

Following this, the output part 127 specifies the head-added subtree PT170 shown in FIG. 36B, the modifier-added subtree PT171 shown in FIG. 36C, the head-added subtree PT180 shown in FIG. 36E and the modifier-added subtree PT181 shown in FIG. 36F as head-added subtrees and modifier-added subtrees generated from the same sentence comprising only one phrase.

Next, the output part 127 determines that a group into which are categorized subtrees completely matching or effectively matching the head-added subtrees PT170 and PT180 representing "detergency *" does not exist. In addition, the output part 127 determines that a group into which are categorized subtrees completely matching or effectively matching the modifier-added subtrees PT171 and PT181 representing "* detergency" does not exist. Following this, the output part 127 generates a tree T14 possessing a root RT14 representing "detergency" and the total tree number "2".

Following this, the output part 127 displays the trees T11 to T14 on the counting results screen.

Following this, the output part 127 outputs the generated counting result screen to the LAN card 106 (step S11 of FIG. 5) and then ends execution of the counting process.

The first through fifth preferred embodiments can be combined with each other. It is possible to provide a counting device 100 provided with a composition for realizing the functions according to any of the first through fifth preferred embodiments, and it is also possible to provide a system that is a system comprising multiple devices and structured to realize functions according to any of the first through fifth preferred embodiments.

It is possible to provide a counting device 100 provided in advance with a composition for realizing the functions according to any of the first through fifth preferred embodiments, and by applying a program, it is possible to cause an existing counting device 100 to function as a counting device according to any of the first through fifth preferred embodiments. In other words, by enabling a counting program for causing the various functional compositions of the counting device 100 illustrated by any of the first through fifth preferred embodiments to be realized to be executed by a computer (CPU and/or the like) controlling an existing counting device, it is possible to cause this counting device to function as the counting device 100 according to any of the first through fifth preferred embodiments.

The distribution method of such a program is arbitrary, and it is possible to distribute the program by storing such for example on a recording medium such as a memory card, CD-ROM or DVD-ROM and/or the like, or to distribute the program via a communications medium such as the Internet and/or the like. In addition, the counting method according to the present invention can be implemented using a counting device 100 according to any of the first through fifth preferred embodiments.

The preferred embodiments of the present invention were described in detail above, but the present invention is not limited to the specified preferred embodiment, for various variations and changes are possible within the scope of the present invention as stated in the Claims.

Moreover, the above-described preferred embodiments are used to explain the present invention but are intended to be illustrative and not limiting on the scope of the present invention. In other words, the scope of the present invention is illustrated by the Claims and not the preferred embodiments. In addition, it is intended that the application be construed as including all such modifications and variations insofar as they come within the spirit and scope of the subject matter disclosed herein.

This application claims the benefit of Japanese Patent Application No. 2012-103996, filed on 27 Apr. 2012, the entire disclosure of which is incorporated by reference herein.

REFERENCE SIGNS LIST

10 Communication network
20, 21 Terminal device
100 Counting device
101 CPU
102 ROM
103 RAM
104 Hard disk
105 Media controller
106 LAN card
107 Video card
108 LCD
109 Keyboard
110 Speaker
111 Touchpad
120 Input part 121 Saving part
122 Syntax analyzing part
123 Subtree generating part
124 Match determination part
125 Categorizing part
126 Counting part
127 Output part
128 Phrase conversion part
129 Information memory

The invention claimed is:

1. A counting device for counting input sentences, comprising:
- at least one non-transitory memory operable to store program code;
- at least one processor operable to read said program code and operate as instructed by said program code, said program code including:
  - receiving code that causes the at least one processor to receive a first sentence and a second sentence;
  - syntax analyzing code that causes the at least one processor to generate a syntax tree of the first sentence by analyzing syntax of the first sentence, and a syntax tree of the second sentence by analyzing syntax of the second sentence;
  - subtree generating code that causes the at least one processor to generate one or more first subtrees of the first sentence based on the syntax tree of the first sentence, and one or more second subtrees of the second sentence based on the syntax tree of the second sentence;
  - match determination code that causes the at least one processor to determine whether or not a first expression represented by a first subtree of the one or more first subtrees and a second expression represented by a second subtree of the one or more second subtrees represent matching content based on each of the one or more first subtrees and each of the one or more second subtrees;
  - categorizing code that causes the at least one processor to categorize the first subtree and the second subtree into a group based on the match determination code determining one combination of the first expression and the second expression represents matching content, or respective multiple combinations of the first expression and the second expression represent matching content; and,
  - output code that causes the at least one processor to output a counted number of subtrees categorized into the group,
- wherein the match determination code further causes the at least one processor to, for one group combination or each of multiple group combinations that are combinations of a first group and a second group into which one or multiple subtrees are respectively categorized, determine an inclusion relationship between the first group and the second group, based on height, branch number and number of phrases of subtrees belonging to the first group and height, branch number and number of phrases of subtrees belonging to the second group; and
- the output code further causes the at least one processor to, based on the determined inclusion relationship, arrange and output an expression represented by one subtree or multiple expressions respectively represented by multiple subtrees categorized in the first group, and an expression represented by one subtree or multiple expressions respectively represented by multiple subtrees categorized in the second group.

2. The counting device according to claim 1, wherein the match determination code further causes the at least one processor to determine that the first expression represented by the first subtree and the second expression represented by the second subtree match when the first subtree and the second subtree match in all of the following: height, branch number, and phrases respectively divided into a root and one or multiple leaves.

3. The counting device according to claim 2, wherein the match determination code further causes the at least one processor to, for the one subtree combination or each of the multiple subtree combinations:
- determine that a first subtree modifier phrase of the first subtree composing the subtree combination and a second subtree modifier phrase of a second subtree composing the subtree combination match when the first subtree modifier phrase is a synonym of the second subtree modifier phrase, or when the difference between the first subtree modifier phrase and the second subtree modifier phrase is a difference in conjugation, or when the difference between the first subtree modifier phrase and the second subtree modifier phrase is a difference in notation; and
- determine that a first subtree head phrase of the first subtree and a second subtree head phrase of the second subtree match when the first subtree head phrase is a synonym for the second subtree head phrase, or when the difference between the first subtree head phrase and the second subtree head phrase is a difference in conjugation, or when the difference between the first subtree head phrase and the second subtree head phrase is a difference in notation.

4. The counting device according to claim 3, further comprising:
- phrase conversion code that causes the at least one processor to convert a head phrase to an affirmative expression and a modifier phrase to a negative expression when, for the one subtree combination or each of the multiple subtree combinations, the end of a modifier phrase of a first subtree composing the subtree combination is "to" or "to ha", the modifier phrase of the first subtree includes a declinable word and includes an affirmative expression, there are no commas between the modifier phrase of the first subtree and the head phrase of the first subtree, and the head phrase of the first subtree includes a negative expression;
- wherein for the one subtree combination or each of the multiple subtree combinations, the match determination code further causes the at least one processor to determine whether or not the modifier phrase of the converted first subtree composing the subtree combination and a modifier phrase of a second subtree composing the subtree combination match, and whether or not the head phrase of the converted first subtree and the head phrase of the second subtree match.

5. The counting device according to claim 4, wherein:
- the receiving code further causes the at least one processor to input a first sentence and a second sentence that are response sentences to questions; and
- for subtree combinations comprising a first subtree possessing a head phrase and a prescribed number of modifier phrases and a second subtree possessing a head phrase and the prescribed number of modifier phrases, within the one subtree combination or each of the multiple subtree combinations, the match determination code further causes the at least one processor to determine that the head phrase possessed by the first subtree and the head phrase possessed by the second subtree match upon determining that each of the prescribed number of modifier phrases possessed by the first subtree respectively match the prescribed number of modifier phrases possessed by the second subtree.

6. The counting device according to claim 1, wherein:
the subtree generating code further causes the at least one processor to generate the one or more first subtrees possessing at least a first subtree modifier phrase modifying another first subtree phrase and a first subtree head phrase that is the other first subtree phrase, from among multiple phrases comprising the first sentence, from the generated syntax tree of the first sentence, and the one or more second subtrees possessing at least a second subtree modifier phrase modifying another second subtree phrase and a second subtree head phrase that is the other second subtree phrase, from among the multiple phrases comprising the second sentence, from the generated syntax tree of the second sentence; and
the match determination code further causes the at least one processor to determine whether or not the first expression represented by the first subtree and the second expression represented by the second subtree match based on whether or not the first subtree modifier phrase and the second subtree modifier phrase match, and whether or not the first subtree head phrase and the second subtree head phrase match.

7. The counting device according to claim 1, wherein:
the match determination code further causes the at least one processor to, for group combinations in which a number of modifier phrases possessed by subtrees categorized in the first group is smaller than a number of modifier phrases possessed by subtrees categorized in the second group from the one group combination or the multiple group combinations, determine that the expression represented by subtrees categorized to the first group is a superior expression to the expression represented by subtrees categorized to the second group when all of the modifier phrases possessed by subtrees categorized to the first group match any of the modifier phrases possessed by subtrees categorized to the second group; and
the categorizing code further causes the at least one processor to, for the one group combination or the respective multiple group combinations, make the first group a superior group to the second group when the match determination code determines that the expression represented by subtrees categorized to the first group comprising the group combination is a superior expression to the expression represented by subtrees categorized to the second group comprising the group combination.

8. The counting device of claim 7, wherein the match determination code further causes the at least one processor to, for group combinations comprising a first group into which subtrees possessing a first group head phrase and a first group modifier phrase are categorized and a second group into which subtrees possessing a second group head phrase and a second group modifier phrase and a second group phrase modifying the second group modifier phrase are categorized from the one group combination or from among the multiple group combinations, determine that the expression represented by subtrees categorized to the first group is a superior expression to the expression represented by subtrees categorized to the second group upon determining that the first group head phrase and the second group head phrase match, and that the first group modifier phrase and the second group modifier phase match.

9. A non-transitory computer-readable recording medium on which is recorded a counting program for causing a computer to function as:
an input part for inputting a first sentence and a second sentence;
a syntax analyzing part for generating a syntax tree of the first sentence by analyzing syntax of the first sentence, and a syntax tree of the second sentence by analyzing syntax of the second sentence;
a subtree generating part for generating one or more first subtrees of the first sentence based on the syntax tree of the first sentence, and generating one or more second subtrees of the second sentence based on the syntax tree of the second sentence;
a match determination part for determining whether or not a first expression represented by a first subtree of the one or more first subtrees and a second expression represented by a second subtree of the one or more second subtrees represent matching content based on each of the one or more first subtrees and each of the one or more second subtrees;
a categorizing part for categorizing the first subtree and the second subtree into a group based on the match determination part determining one combination of the first expression and the second expression represents matching content, or respective multiple combinations of the first expression and the second expression represent matching content; and,
an output part for outputting a counted number of subtrees categorized into the group,
wherein the match determination part, for one group combination or each of multiple group combinations that are combinations of a first group and a second group into which one or multiple subtrees are respectively categorized, determines an inclusion relationship between the first group and the second group, based on height, branch number and number of phrases of subtrees belonging to the first group and height, branch number and number of phrases of subtrees belonging to the second group; and
the output part, based on the determined inclusion relationship, arranges and outputs an expression represented by one subtree or multiple expressions respectively represented by multiple subtrees categorized in the first group, and an expression represented by one subtree or multiple expressions respectively represented by multiple subtrees categorized in the second group.

10. A method executed by a counting device comprising an input part, a syntax analyzing part, a subtree generating part, a match determination part, a categorizing part and an output part, the method including:
an input step in which the input part inputs a first sentence and a second sentence;
a syntax analysis step in which the syntax analyzing part generates a syntax tree of the first sentence by analyzing syntax of the first sentence, and a syntax tree of the second sentence by analyzing syntax of the second sentence;
a subtree generation step in which the subtree generating part generates first subtrees of the first sentence based on the syntax tree of the first sentence, and generates second subtrees of the second sentence based on the syntax tree of the second sentence;

a match determination step in which the match determination part determines whether or not a first expression represented by one of the first subtrees and a second expression represented by one of the second subtrees represent matching content based on each of the first subtrees and each of the second subtrees;

a categorization step in which the categorizing part categorizes the one of the first subtrees and the one of the second subtrees into a group based on the match determination step determining one combination of the first expression and the second expression represents matching content, or respective multiple combinations of the first expression and the second expression represent matching content; and, an output step in which the output part outputs a counted number of subtrees categorized into the group, wherein the match determination step, for one group combination or each of multiple group combinations that are combinations of a first group and a second group into which one or multiple subtrees are respectively categorized, determines an inclusion relationship between the first group and the second group, based on height, branch number and number of phrases of subtrees belonging to the first group and height, branch number and number of phrases of subtrees belonging to the second group; and the output step, based on the determined inclusion relationship, arranges and outputs an expression represented by one subtree or multiple expressions respectively represented by multiple subtrees categorized in the first group, and an expression represented by one subtree or multiple expressions respectively represented by multiple subtrees categorized in the second group.

* * * * *